US012614083B2

(12) United States Patent
Kotsiopoulos et al.

(10) Patent No.: US 12,614,083 B2
(45) Date of Patent: Apr. 28, 2026

(54) COMPUTING SYSTEM AND METHOD FOR APPLYING MONTE CARLO ESTIMATION TO DETERMINE THE CONTRIBUTION OF INDIVIDUAL INPUT VARIABLES WITHIN DEPENDENT VARIABLE GROUPS ON THE OUTPUT OF A DATA SCIENCE MODEL

(71) Applicant: Capital One Financial Corporation, McLean, VA (US)

(72) Inventors: Konstandinos Kotsiopoulos, Easthampton, MA (US); Alexey Miroshnikov, Evanston, IL (US); Arjun Ravi Kannan, Buffalo Grove, IL (US)

(73) Assignee: Capital One Financial Corporation, McLean, VA (US)

( * ) Notice: Subject to any disclaimer, the term of this patent is extended or adjusted under 35 U.S.C. 154(b) by 557 days.

(21) Appl. No.: 18/111,826

(22) Filed: Feb. 20, 2023

(65) Prior Publication Data

US 2024/0281670 A1 Aug. 22, 2024

(51) Int. Cl.
*G06N 5/022* (2023.01)

(52) U.S. Cl.
CPC .................................... *G06N 5/022* (2013.01)

(58) Field of Classification Search
CPC ....................................................... G06N 5/022
USPC ............................................................. 706/12
See application file for complete search history.

(56) References Cited

U.S. PATENT DOCUMENTS

| | | |
|---|---|---|
| 8,370,253 B1 | 2/2013 | Grossman |
| 11,030,583 B1 | 6/2021 | Garg et al. |
| 11,636,386 B2 | 4/2023 | Lohia et al. |
| 12,020,133 B2 | 6/2024 | Goldszmidt et al. |
| 12,277,455 B2 | 4/2025 | Walters et al. |
| 2011/0270782 A1 | 11/2011 | Trenner et al. |

(Continued)

FOREIGN PATENT DOCUMENTS

WO 2021/074491 A1 4/2021

OTHER PUBLICATIONS

W3Schools, Machine Learning—Train/Test, 2023 (Year: 2023).*

(Continued)

*Primary Examiner* — Tarek Elchanti
(74) *Attorney, Agent, or Firm* — Lee Sullivan Shea & Smith LLP

(57) ABSTRACT

A computing platform is configured to, for a model object trained to output a score for an input data record, the input data record including a set of input variables that are arranged into groups based on dependencies, iterate the following for each respective input variable in each respective group: (a) identify a sample from a set of historical data records, (b) determine a first score for the sample, (c) determine a second score for the sample that is conditioned on the respective group in a given input data record, (d) select a random variable coalition within the respective group, (e) compute a group-specific contribution value for the respective input variable in the respective group, and (f) compute an iteration-specific contribution value for the respective input variable to the model output, and (vi) for each respective input variable, aggregate the iteration-specific contribution values and thereby determine an aggregated contribution value for the respective input variable.

20 Claims, 9 Drawing Sheets

(56)                References Cited

U.S. PATENT DOCUMENTS

| | | | |
|---|---|---|---|
| 2014/0229415 A1 | 8/2014 | Martineau et al. | |
| 2018/0285685 A1 | 10/2018 | Singh et al. | |
| 2019/0087744 A1 | 3/2019 | Schiemenz | |
| 2019/0188605 A1 | 6/2019 | Zavesky et al. | |
| 2019/0279111 A1 | 9/2019 | Merrill et al. | |
| 2019/0378210 A1 | 12/2019 | Merrill et al. | |
| 2020/0081865 A1 | 3/2020 | Farrar et al. | |
| 2020/0082299 A1 | 3/2020 | Affonso et al. | |
| 2020/0184350 A1 | 6/2020 | Bhide et al. | |
| 2020/0218987 A1 | 7/2020 | Jiang et al. | |
| 2020/0302309 A1 | 9/2020 | Golding | |
| 2020/0302524 A1* | 9/2020 | Kamkar | G06N 7/01 |
| 2020/0311486 A1 | 10/2020 | Dey et al. | |
| 2020/0320428 A1 | 10/2020 | Chaloulos et al. | |
| 2020/0372035 A1 | 11/2020 | Tristan et al. | |
| 2020/0372304 A1 | 11/2020 | Kenthapadi et al. | |
| 2020/0372406 A1 | 11/2020 | Wick | |
| 2020/0380398 A1 | 12/2020 | Weirder et al. | |
| 2020/0410129 A1 | 12/2020 | Nadler et al. | |
| 2021/0081828 A1 | 3/2021 | Lopez De Prado | |
| 2021/0133870 A1 | 5/2021 | Kamkar et al. | |
| 2021/0158102 A1 | 5/2021 | Lohia et al. | |
| 2021/0173402 A1* | 6/2021 | Chang | G05D 1/0221 |
| 2021/0174222 A1 | 6/2021 | Dodwell et al. | |
| 2021/0224605 A1 | 7/2021 | Zhang et al. | |
| 2021/0224687 A1 | 7/2021 | Goldszmidt et al. | |
| 2021/0241033 A1 | 8/2021 | Yang | |
| 2021/0248503 A1 | 8/2021 | Hickety et al. | |
| 2021/0256832 A1 | 8/2021 | Weisz et al. | |
| 2021/0304039 A1* | 9/2021 | Tang | G06N 5/01 |
| 2021/0334654 A1 | 10/2021 | Himanshi et al. | |
| 2021/0350272 A1 | 11/2021 | Miroshnikov et al. | |
| 2021/0383268 A1 | 12/2021 | Miroshnikov et al. | |
| 2021/0383275 A1 | 12/2021 | Miroshnikov et al. | |
| 2022/0036203 A1 | 2/2022 | Nachum et al. | |
| 2024/0095605 A1* | 3/2024 | Fylstra | G06N 3/047 |

OTHER PUBLICATIONS

Aas et al. Explaining Individual Predictions When Features are Dependent: More Accurate Approximations to Shapley Values. arXiv preprint arXiv:1903.10464v3. Feb. 6, 2020. 28 pages.
Abduljabbar et al. Applications of Artificial Intelligence in Transport: An Overview. Sustainability. 2019. 24 pages.
Casalicchio, Giuseppe. Visualizing the Feature Importance for Black Box Models. Machine Learning and Knowledge Discovery in Databases. ECML PKDD 2018. Lecture Notes in Computer Science. vol. 11051. Springer. pp. 655-670 [online], [retrieved on Mar. 28, 2025] Retrieved from the Internet <URL: https://doi.org/10. 1007/978-3-030-10925-7_40>.
Kwak, Nojun et al. Input Feature Selection for Classification Problems. IEEE Transactions on Neural Networks. vol. 13, No. 1. pp. 143-159. 2002. 17 pages.
Lundberg, Scott M., et al. Consistent Individualized Feature Attribution for Tree Ensembles. arXiv preprint arxiv:1802.03888v2. Jun. 18, 2018. 9 pages.
Wehle et al., "Machine Learning, Deep Learning, and AI: What's the Difference?" Data Scientist Innovation Day (2017).
Wuest et al., "Machine Learning in Manufacturing: Advantages, Challenges and Applications," Production and Manufacturing Research, vol. 4, 23-45 (2016).
Zeng et al. Jackknife approach to the estimation of mutual information. PNAS, vol. 115, No. 40. Oct. 18, 2018. 6 pages.
Zhao et al. Causal Interpretations of Black-Box Models. J Bus., Econ. Stat., DOI:10.1080/07350015.2019.1624293, 2019, 16 pages.
International Search Report and Written Opinion issued in International Application No. PCT/US2022/029670, mailed on Sep. 7, 2022, 10 pages.
Perrone et al. Fair Bayesian Optimization. AIES '21, May 19-21, 2021, Virtual Event, USA. pp. 854-863.

Rawls, John. Justice as Fairness: A Restatement. Harvard University Press. 2001, 32 pages.
Reshef et al. An Empirical Study of Leading Measures of Dependence. arXiv preprint arXiv:1505.02214. May 12, 2015, 42 pages.
Reshef et al. Detecting Novel Associations in Large Data Sets. Science, vol. 334. Dec. 2011, pp. 1518-1524.
Reshef et al. Measuring Dependence Powerfully and Equitably. Journal of Machine Learning Research, vol. 17. 2016, 63 pages.
Ribeiro et al. "Why Should I Trust You?" Explaining the Predictions of Any Classifier. 22nd Conference on Knowledge Discovery and Data Mining, San Francisco, CA. arXiv:1602.04938v3. Aug. 9, 2016, 10 pages.
Royden et al. Real Analysis. Boston: Prentice Hall, 4th Edition. 2010, 516 pages.
Santambrogio, Filippo. Optimal Transport for Applied Mathematicians. Calculus of Variations, PDEs and Modeling. Springer. May 2015, 356 pages.
Schmidt et al. An Introduction to Artificial Intelligence and Solutions to the Problems of Algorithmic Discrimination. arXiv preprint arXiv:1911.05755. vol. 73, No. 2. 2019, pp. 130-144.
Shapley, L.S. A Value for n-Person Games. Annals of Mathematics Studies. 1953, 13 pages.
Shiryaev, A.N. Probability. Springer, Second Edition. 1980, 22 pages.
Shorack et al. Empirical Processes with Applications to Statistics. Wiley, New York. 1986, 36 pages.
Strumbelji et al. Explaining Prediction Models and Individual Predictions with Feature Contributions. Springer. Knowledge Information System, vol. 41, No. 3. 2014, pp. 647-665.
Sundararajan et al. The Many Shapley Values for Model Explanation. arXiv preprint arXiv:1908.08474v1, Aug. 22, 2019, 9 pages.
Szekely et al. Measuring and Testing Dependence by Correlation of Distances. The Annals of Statistics, vol. 35, No. 6. ArXiv:0803. 4101v1, Mar. 28, 2008, 26 pages.
Thorpe, Matthew, Introduction to Optimal Transport, University of Cambridge, 2018, 56 pages.
Villani, Cedric. Optimal Transport, Old and New. Springer. Jun. 13, 2008, 998 pages.
Wasserman et al. All of Statistics: A Concise Course in Statistical Inference. Springer Texts in Statistics. 2004, 14 pages.
Woodworth et al. Learning Non-Discriminatory Predictors. Proceedings of Machine Learning Research, vol. 65, No. 1-34. 2017, 34 pages.
Young. Monotonic Solutions of Cooperative Games International Journal of Game Theory, vol. 14, Issue 2. 1985. 8 pages.
Zemel et al. Learning Fair Representations. Proceedings of the 30th International Conference on Machine Learning, PMLR vol. 28, No. 3. 2013, pp. 325-333.
Zhang et al. Mitigating Unwanted Biases with Adversarial Learning. In Proceedings of the 2018 AAAI/ACM Conference on AI, Ethics, and Society. Feb. 2-3, 2018, pp. 335-340.
Balashankar et al. Pareto-Efficient Fairness for Skewed Subgroup Data. In the International Conference on Machine earning AI for Social Good Workshop. vol. 8. Long Beach, United States, 2019, 8 pages.
Banzhaf III. Weighted Voting Doesn't Work: A Mathematical Analysis. Rutgers Law Review, vol. 19, No. 2, 1965, 28 pages.
Barocas et al. Fairness and Machine Learning: Limitations and Opportunities. [online], 253 pages, 1999 [retrieved online on May 26, 2022]. Retrieved from the Internet :<URL:https://fairmlbook. org/>.
Bergstra et al. Algorithms for Hyper-Parameter Optimization. NIPS 11: Proceedings of the 24th International conference on Neural Information Processing Systems. Dec. 2011, 9 pages.
Bousquet et al. Stability and Generalization. Journal of Machine Learning Research 2. Mar. 2002, pp. 499-526.
Chen et al. True to Model or True to the Data? arXiv preprint arXiv:2006.1623v1, Jun. 29, 2020, 7 pages.
Cover et al. Elements of Information Theory. A John Wiley & Sons, Inc., Publication. Second Edition, 2006, 774 pages.
Del Barrio et al. Obtaining Fairness Using Optimal Transport Theory. arXiv preprint arXiv:1806.03195v2. Jul. 19, 2018, 25 pages.

(56) References Cited

OTHER PUBLICATIONS

Del Barrio et al. On Approximate Validation of Models: A Kolmogorov-Smirnov Based Approach. arXiv:1903.08687v1, Mar. 20, 2019, 32 pages.

Dickerson et al. Machine Learning. Considerations for fairly and transparently expanding access to credit. 2020, 29 pages [online]. Retrieved online: URL<https://info.h2o.ai/rs/644-PKX-778/images/Machine%20Learning%20-%20Considerations%20for%20Fairly%20and%20Transparently%20Expanding%20Access%20to%20Credit.pdf>.

Dwork et al. Generalization in Adaptive Data Analysis and Holdout Reuse. NIPS'15: Proceedings of the 28th International Conference on Neural Information Processing Systems, vol. 2, Dec. 2015, 9 pages.

Dwork et al. Fairness Through Awareness. Proceedings of the 3rd Innovations in Theoretical Computer Science Conference, 2012, 214-226.

Equal Credit Opportunity Act (ECOA). FDIC Law, Regulations, Related Actions, 9 pages [online]. Retrieved online: URL < https://www.fdic.gov/regulations/laws/rules/6000-1200.html>.

Equal Employment Opportunity Act. 2 pages [online]. Retrieved online: URL<https://www.dol.gov/sites/dolgov/files/ofccp/regs/compliance/posters/pdf/eeopost.pdf>.

Fair Housing Act (FHA). FDIC Law, Regulations, Related Actions, 2022, 3 pages [online]. Retrieved online: URL<https://www.ecfr.gov/current/title-12/chapter-III/subchapter-B/part-338.

Feldman et al. Certifying and Removing Disparate Impact. Proceedings of the 21th ACM SIGKDD International Conference on Knowledge Discovery and Data Mining, 2015, 259-268.

Friedman, Jerome. 1999 Reitz Lecture. Greedy Function Approximation: A Gradient Boosting Machine. Annals of Statistics, vol. 29, No. 6. 2001, pp. 1189-1232.

G. Owen. Modification of the Banzhaf-Coleman index for Games with a Priori Unions. Power, Voting and Voting Power. 1981, pp. 232-238.

Goldstein et al. Peeking Inside the Black Box: Visualizing Statistical Learning with Plots of Individual Conditional Expectation. arXiv:1309.6392v2J. Mar. 20, 2014, 22 pages.

Hall et al. A United States Fair Lending Perspective on Machine Learning. Frontiers in Artificial Intelligence. doi: 10.3389/frai.2021.695301, Jun. 7, 2021, 9 pages.

Hall, Patrick. On the Art and Science of Explainable Machine Learning: Techniques, Recommendations, and Responsibilities. KDD'19 XAI Workshop. arXiv preprint arxiv:1810.02909, Aug. 2, 2019, 10 pages.

Hardt et al. Equality of Opportunity in Supervised Learning. Advances in Neural Information Processing Systems, 2015, 3315-3323.

Hashimoto et al. Fairness Without Demographics in Repeated Loss Minimization. In ICML, 2018, 10 pages.

Hastie et al. The Elements of Statistical Learning: Data Mining, Interference, and Prediction. Springer. Second edition, Jan. 13, 2017, 764 pages.

Heller et al. A consistent multivariate test of association based on ranks of distances. Biometrika. arXiv:1201.3522v1. Jan. 17, 2012, 14 pages.

Heller et al. Consistent Distribution-Free K-Sample and Independence Tests for Univariate Random Variables. Journal of Machine Learning Research. vol. 17, No. 29. Feb. 2016, 54 pages.

Janzing et al. Feature relevance quantification in explainable AI: A causal problem. arXiv preprint arXiv:1910.13413v2. Nov. 25, 2019, 11 pages.

Jiang et al. Identifying and Correcting Label Bias in Machine Learning. Proceedings of the 23rd International Conference on Artificial Intelligence and Statistics (AISTATS). 2020, 10 pages.

Jiang et al. Smooth Isotonic Regression: A New Method to Calibrate Predictive Models. AMIA Joint Summits on Translational Science proceedings. 2011, pp. 16-20.

Kamiran et al. Classifying without Discriminating. 2009 2nd International Conference on Computer, Control and Communication. doi: 10.1109/IC4.2009.4909197. 2009, pp. 1-6.

Kamiran et al. Data Preprocessing Techniques for Classification Without Discrimination. Knowl. Inf. Syst. DOI 10.1007/s10115-011-0463-8. Dec. 3, 2011, 33 pages.

Kamiran et al. Discrimination Aware Decision Tree Learning. 2010 IEEE International Conference on Data Mining. doi: 10.1109/ICDM.2010.50. 2010, pp. 869-874.

Kamishima et al. Fairness-Aware Classifier with Prejudice Remover Regularizer. Proceedings of the European Conference on Machine Learning and Principles and Practice of Knowledge Discovery in Databases (ECMLPKDD), Part II. 2012, pp. 35-50.

Karush, William. Minima of Functions of Several Variables with Inequalities as Side Constraints. A Dissertation Submitted to the Faculty of the Division of the Physical Sciences in Candidacy for the Degree of Master in Science. Department of Mathematics. University of Chicago. Dec. 1939, 29 pages.

Kearns et al. Algorithmic Stability and Sanity-Check Bounds for Leave-One-Out Cross-Validation. Neural Computation, vol. 11, No. 6. 1999, pp. 1427-1453.

Koralov et al. Theory of Probability and Random Processes. Second Edition. Springer. 1998, 349 pages.

Kovalev et al. A Robust Algorithm for Explaining Unreliable Machine Learning Survival Models Using the Kolmogorov-Smirnov Bounds. Neural Networks. arXiv:2005.02249v1, May 5, 2020. pp. 1-39.

Kuhn et al. Nonlinear programming. In Proceedings of the Second Berkeley Symposium on Mathematical Statistics and Probability. Berkeley, Calif. University of California Press. 90. 1951, pp. 481-492.

Lahoti et al. Fairness without Demographics through Adversarially Reweighted Learning. arXiv preprint arXiv:2006.13114. 2020, 13 pages.

Lipovetsky et al. Analysis of Regression in Game Theory Approach. Applied Stochastic Models Business and Industry. vol. 17. Apr. 26, 2001, pp. 319-330.

Lorenzo-Freire, Silvia. New characterizations of the Owen and Banzhaf-Owen values using the intracoalitional balanced contributions property. Department of Mathematics. 2017, 23 pages.

Lundberg et al. Consistent Individualized Feature Attribution for Tree Ensembles. arXiv preprint arxiv:1802.03888v3. Mar. 7, 2019, 9 pages.

Lundberg et al. A Unified Approach to Interpreting Model Predictions. 31st Conference on Neural Information Processing Systems, 2017, 10 pages.

Markowitz, Harry. Portfolio Selection. The Journal of Finance. vol. 7, No. 1. 1952, pp. 77-91.

Miroshinikov et al. Model-Agnostic Bias Mitigation Methods with Regressor Distribution Control for Wasserstein-Based Fairness Metrics. arXiv:2111.11259v1. Nov. 19, 2021, 29 pages.

Miroshinikov et al. Mutual Information-Based Group Explainers with Coalition Structure for Machine Learning Model Explanations. Computer Science and Game Theory. arXiv:2102.10878v1. Feb. 22, 2021, 46 pages.

Miroshinikov et al. Wasserstein-Based Fairness Interpretability Framework for Machine Learning Models. arXiv:2011.03156v1. Nov. 6, 2020, 34 pages.

Owen, Guillermo. Values of Games with a Priori Unions. In: Essays in Mathematical Economics and Game Theory. Springer, 1977, pp. 76-88.

Pareto. Optimality. In: Multiobjective Linear Programming. Springer International Publishing. DOI 10.1007/978-3-319-21091-9_4. 2016, pp. 85-118.

Blum et al. Recovering from Biased Data: Can Fairness Constraints Improve Accuracy? Toyota Technological Institute at Chicago arXiv:1912.01094v1 [cs.LG] Dec. 4, 2019, 20 pages.

Varley et al. Fairness in Machine Learning with Tractable Models. School of Informatics, University of Edinburgh, UK arXiv:1905.07026v2 [cs.LG] Jan. 13, 2020, 26 pages.

Hickey et al. Fairness by Explicability and Adversarial SHAP Learning. Experian UK&I and EMEA DataLabs, London, UK arXiv:2003.05330v3 [cs.LG] Jun. 26, 2020, 17 pages.

Manu Joseph. Interpretability Cracking open the black box—Part 11. Machine Learning. Deep & Shallow, Nov. 16, 2019-Nov. 28, 2019, 23 pages.

(56) References Cited

OTHER PUBLICATIONS

Manu Joseph. Interpretability Cracking open the black box—Part 111. Machine Learning. Deep & Shallow, Nov. 24, 2019-Dec. 30, 2020, 29 pages.

Krivoruchko et al. Using Multivariate Interpolation for Estimating Well Performance, Esri.com, Arcuser. Esri Technology Summer 2014, 13 pages. URL:<URL: https://www.esri.com/abouUnewsroom/arcuser/using-multivariate-interpolation-for-estimating-well-performance/>.

Chen et al. Comparison and Improvement of the predictability and interpretability with ensemble learning models in QSPR applications. Journal of Cheminformatics, Mar. 30, 2020, 50 pages. <URL:https://jcheminf.biomedcentral.com/articles/10.1186/s13321-020-0417-9>.

Ding et al. Comparisons of Two Ensemble Mean Methods in Measuring the Average Error Growth and the Predictability. The Chinese Meteorological Society and Springer-Verlag Berlin Heidelberg, No. 4, vol. 25, Mar. 21, 2011, pp. 395-404 <URL:https://www.researchgate.net/publication/253261791>.

Hu et al. Locally Interpretable Models and Effects based on Supervised Partitioning, Wells Fargo, Jun. 1, 2018, 15 pages <URL: https://arxiv.org/pdf/1806.00663>.

Jiang et al. Wasserstein Fair Classification. Proceedings of the Thirty-Fifth Conference on Uncertainty in Artificial Intelligence, arXiv:1907.12059v1 [stat.ML] Jul. 28, 2019, 15 pages. <URL: chrome-extension://efaidnbmnnnibpcajpcglclefindmkaj/http://proceedings.mlr.press/v115/jiang20a/jiang20a.pdf>.

Wei et al. Optimized Score Transformation for Consistent Fair Classication, arXiv:1906.00066v3 [cs.LG] Oct. 29, 2021, 78 pages <URL: chrome-extension://efaidnbmnnnibpcajpcglclefindmkaj/https://arxiv.org/pdf/1906.00066.pdf>.

Iosifidis et al. FAE: A Fairness-Aware Ensemble Framework, IEEE, arXiv:2002.00695v1 [cs.AI] Feb. 3, 2020, 6 pages. <URL:https://arxiv.org/abs/2002.00695>.

Abduljabbar et al., "Applications of Artificial Intelligence in Transport: An Overview," Sustainability (2019).

Albizuri et al. On Coalitional Semivalues. Games and Economic Behavior 49, Nov. 29, 2002, 37 pages.

Alonso-Meijide et al. Modification of the Banzhaf Value for Games with a Coalition Structure. Annals of Operations Research, Jan. 2002, 17 pages.

Amer et al. The modified Banzhaf value for games with coalition structure: an axiomatic characterization. Mathematical Social Sciences 43, (2002) 45-54, 10 pages.

Apley et al., "Visualizing the Effects of Predictor Variables in Black Box Supervised Leaming Models," Ar Xiv (2016).

Aumann et al. Cooperative Games with Coalition Structure. International journal of Game Theory, vol. 3, Issue 4, Jul. 1974, pp. 217-237.

Aurenhammer et al., Voronoi Diagrams and Delaunay Triangulations, pp. 7-13, 41-45, New Jersey, World Scientific Publishing (2013).

Breiman et al. Estimating Optimal Transformations for Multiple Regression and Correlation. Journal of the American Statistical Association. vol. 80, No. 391, Sep. 1985, 19 pages.

Bzdok et al., "Statistics Versus Machine Learning," Nature Methods, vol. 15, 233-234 (Apr. 2018).

Casas-Mendez et al. An extension of the tau-value to games with coalition structures. European Journal of Operational Research, vol. 148, 2003, pp. 494-513.

Dubey et al. Value Theory Without Efficiency. Mathematics of Operations Research. vol. 6, No. 1. 1981, pp. 122-128.

Eggleston, H.G., Convexity, pp. 33-38, Cambridge University Press (1958).

Elshawi et al. On the interpretability of machine learning-based model for predicting hypertension. BMC Medical Informatics and Decision Making. vol. 19, No. 146. 2019, 32 pages.

Explainable Artificial Intelligence (xAI), Defense Advanced Research Projects Agency, DARPA-BAA-16-53 (2016).

FDIC Title VII-Equal Credit Opportunity, FDIC Law, Regulations, Related Acts—Consumer Protection (Dec. 31, 2019).

Gretton et al. A Kernel Statistical Test of Independence. In Advances in Neural Information Processing Systems. 2007, 8 pages.

Gretton et al. A Kernel Two-Sample Test. The Journal of Machine Learning Research. vol. 13, No. 1. Mar. 2012, pp. 723-773.

Gretton et al. Measuring Statistical Dependence with Hilbert-Schmidt Norms. In Algorithmic Learning Theory. Springer-Verlag Berlin Heidelberg. 2005, pp. 63-77.

Hall et al. An Introduction to Machine Learning Interpretability, O'Reilly, Second Edition, Aug. 2019, 62 pages.

Hoeffding, Wassily. A Non-Parametric Test of Independence. The Annals of Mathematical Statistics. 1948, pp. 546-557.

Ji et al. Post-Radiotherapy PET Image Outcome Prediction by Deep Learning Under Biological Model Guidance: A Feasibility Study of Oropharyngeal Cancer Application. Duke University Medical Center. arXiv preprint. 2021, 26 pages.

Jiang et al. Nonparametric K-Sample Tests via Dynamic Slicing. Journal of the American Statistical Association. Harvard Library. Sep. 11, 2015. pp. 642-653.

Jollife et al. Principal Component Analysis. Springer Series in Statistics. Second Edition, 2002, 518 pages.

Kamijo, Yoshio. A two-step Shapley value in a cooperative game with a coalition structure. International Game Theory Review. 2009, 11 pages.

Kraskov et al. Estimating mutual information. The American Physical Society. Physical Review E vol. 69. Jun. 23, 2004, 16 pages.

Leo Breiman. Statistical Modeling: The Two Cultures. Statistical Science, vol. 16, No. 3, 2001, pp. 199-231.

Leo et al., "Machine Learning in Banking Risk Management: A Literature Review," Risks (2019).

Lopez-Paz et al. The Randomized Dependence Coefficient. In Advances in Neural Information Processing Systems. 2013, pp. 1-9.

Lundberg, Scott. Welcome to SHAP Documentation. 2018, 46 pages [online]. Retrieved online URL :< https://shap.readthedocs.io/en/latest/>.

Miroshinikov et al. Wasserstein-based fairness interpretability framework for machine learning models. arXiv:2011.03156v1. Nov. 6, 2020, 34 pages.

Modarres et al. Towards Explainable Deep Learning for Credit Lending: A Case Study. arxiv:1811.06471v2, Nov. 11, 2018, 8 pages.

Paninski, Liam. Estimation of Entropy and Mutual Information. Neural Computation, vol. 15, No. 6. 2003, pp. 1191-1253.

Renyi. On Measures of Dependence. Acta mathematica hungarica, vol. 10, No. 3.1959, pp. 441-451.

SAS/STAT User's Guide, Version 8, Chapter 68 "The VARCLUS Procedure" (1999).

Shiryaev, A.N., Graduate Texts in Mathematics: Probability. 2nd ed., pp. 23-43, Springer (1980).

Szekely et al. Brownian Distance Covariance. The Annals of Applied Statistics, vol. 3, No. 4. 2009. 31 pages.

Tibshirani et al. Estimating the number of clusters in a dataset via the gap statistic. Journal of the Royal Statistical Society, Series B. vol. 63, Part 2. 2001. pp. 411-423.

Tijs. Bounds for the Core and the Tau-Value. Game Theory and Mathematical Economics. 1981, pp. 123-132.

Vanderbei, Robert J. Linear Programming: Foundations and Extensions, 4th ed., pp. 11-16, 141-144, New York, NY, Springer Science and Business Media (2014).

Vaughan et al., "Explainable Neural Networks based on Additive Index Models," Corporate Model Risk, Wells Fargo, USA (Jun. 2018).

Vidal-Puga, Juan. The Harsanyi paradox and the "right to talk" in bargaining among coalitions. Mathematical Social Sciences. vol. 64. Mar. 27, 2012. 32 pages.

Wang et al. Shapley Flow. A Graph-based Approach to Interpreting Model Predictions arXiv preprint arXiv:2010.14592, 2020, 11 pages.

* cited by examiner

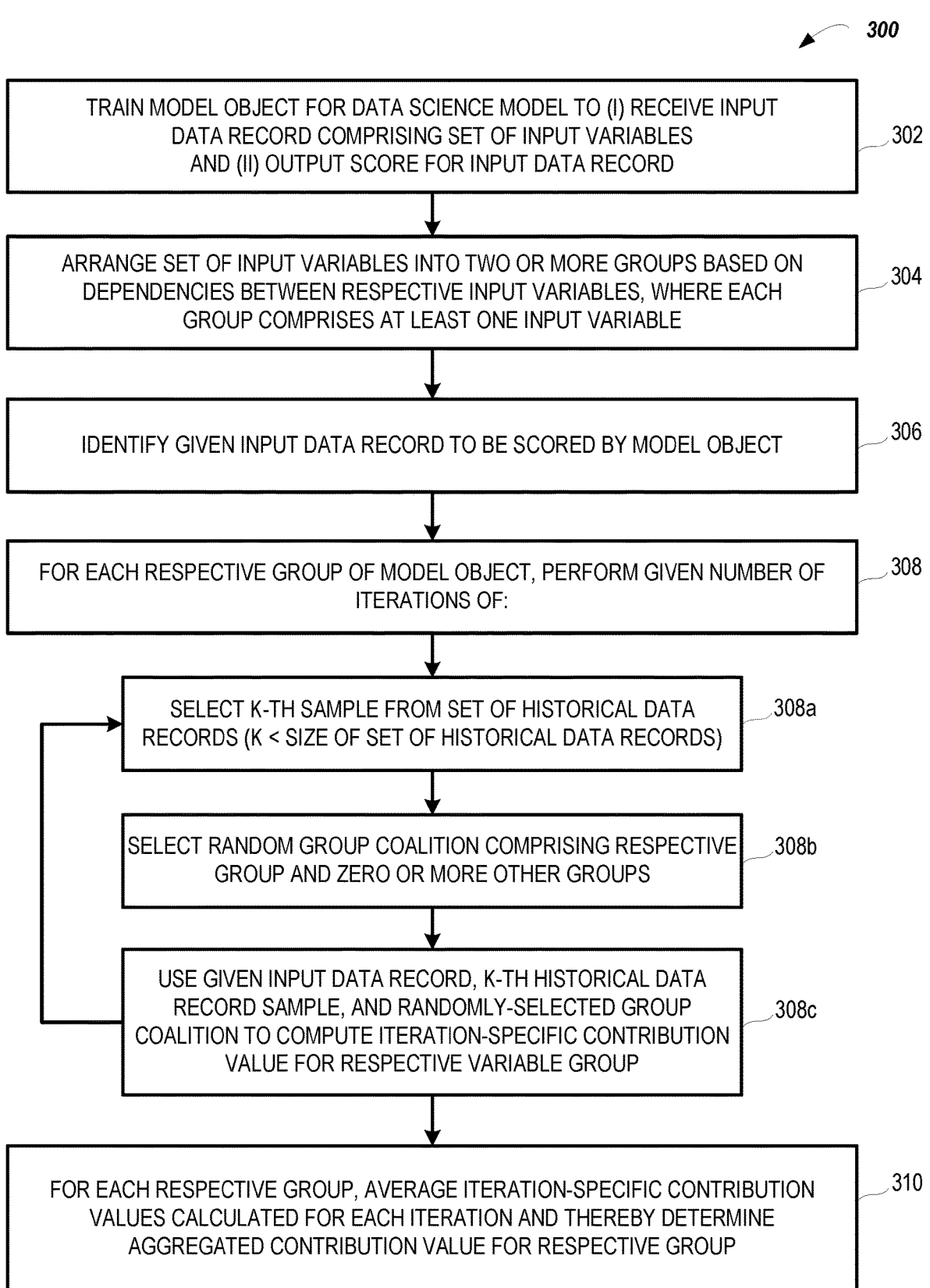

TRAIN MODEL OBJECT FOR DATA SCIENCE MODEL TO (I) RECEIVE INPUT DATA RECORD COMPRISING SET OF INPUT VARIABLES AND (II) OUTPUT SCORE FOR INPUT DATA RECORD — 302

ARRANGE SET OF INPUT VARIABLES INTO TWO OR MORE GROUPS BASED ON DEPENDENCIES BETWEEN RESPECTIVE INPUT VARIABLES, WHERE EACH GROUP COMPRISES AT LEAST ONE INPUT VARIABLE — 304

IDENTIFY GIVEN INPUT DATA RECORD TO BE SCORED BY MODEL OBJECT — 306

FOR EACH RESPECTIVE GROUP OF MODEL OBJECT, PERFORM GIVEN NUMBER OF ITERATIONS OF: — 308

SELECT K-TH SAMPLE FROM SET OF HISTORICAL DATA RECORDS (K < SIZE OF SET OF HISTORICAL DATA RECORDS) — 308a

SELECT RANDOM GROUP COALITION COMPRISING RESPECTIVE GROUP AND ZERO OR MORE OTHER GROUPS — 308b

USE GIVEN INPUT DATA RECORD, K-TH HISTORICAL DATA RECORD SAMPLE, AND RANDOMLY-SELECTED GROUP COALITION TO COMPUTE ITERATION-SPECIFIC CONTRIBUTION VALUE FOR RESPECTIVE VARIABLE GROUP — 308c

FOR EACH RESPECTIVE GROUP, AVERAGE ITERATION-SPECIFIC CONTRIBUTION VALUES CALCULATED FOR EACH ITERATION AND THEREBY DETERMINE AGGREGATED CONTRIBUTION VALUE FOR RESPECTIVE GROUP — 310

FIG. 3

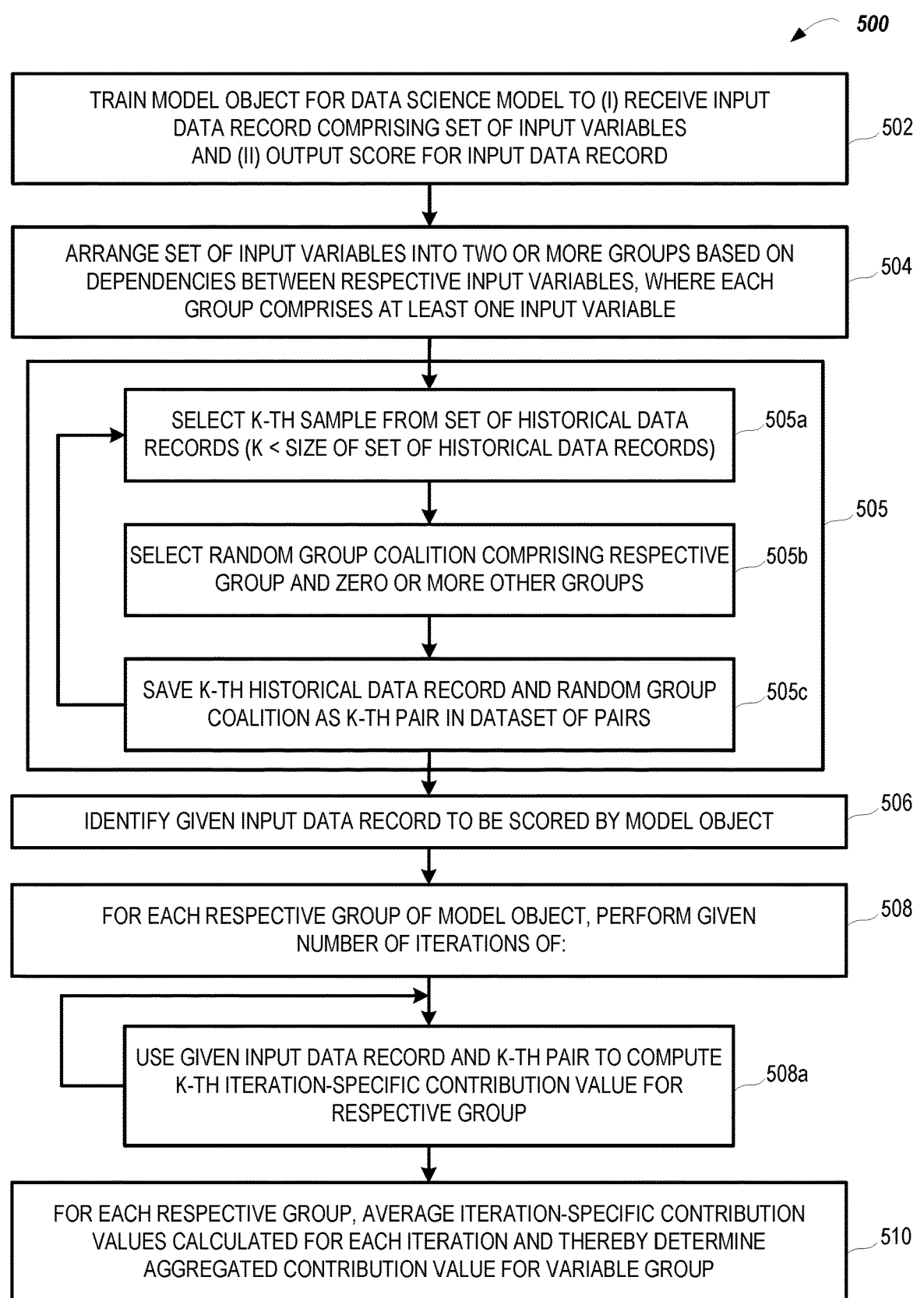

*500*

TRAIN MODEL OBJECT FOR DATA SCIENCE MODEL TO (I) RECEIVE INPUT DATA RECORD COMPRISING SET OF INPUT VARIABLES AND (II) OUTPUT SCORE FOR INPUT DATA RECORD — 502

ARRANGE SET OF INPUT VARIABLES INTO TWO OR MORE GROUPS BASED ON DEPENDENCIES BETWEEN RESPECTIVE INPUT VARIABLES, WHERE EACH GROUP COMPRISES AT LEAST ONE INPUT VARIABLE — 504

SELECT K-TH SAMPLE FROM SET OF HISTORICAL DATA RECORDS (K < SIZE OF SET OF HISTORICAL DATA RECORDS) — 505a

SELECT RANDOM GROUP COALITION COMPRISING RESPECTIVE GROUP AND ZERO OR MORE OTHER GROUPS — 505b

SAVE K-TH HISTORICAL DATA RECORD AND RANDOM GROUP COALITION AS K-TH PAIR IN DATASET OF PAIRS — 505c

— 505

IDENTIFY GIVEN INPUT DATA RECORD TO BE SCORED BY MODEL OBJECT — 506

FOR EACH RESPECTIVE GROUP OF MODEL OBJECT, PERFORM GIVEN NUMBER OF ITERATIONS OF: — 508

USE GIVEN INPUT DATA RECORD AND K-TH PAIR TO COMPUTE K-TH ITERATION-SPECIFIC CONTRIBUTION VALUE FOR RESPECTIVE GROUP — 508a

FOR EACH RESPECTIVE GROUP, AVERAGE ITERATION-SPECIFIC CONTRIBUTION VALUES CALCULATED FOR EACH ITERATION AND THEREBY DETERMINE AGGREGATED CONTRIBUTION VALUE FOR VARIABLE GROUP — 510

FIG. 5

**INPUT DATA RECORD: $x^*$**

| VARIABLE GROUP | CONTRIBUTION VALUE | INPUT VARIABLE | CONTRIBUTION VALUE |
|---|---|---|---|
| $S_1$ | 0.65 | $X_1$ | 0.45 |
| | | $X_2$ | 0.15 |
| | | $X_3$ | 0.05 |
| $S_2$ | -0.25 | $X_4$ | -0.25 |
| $S_3$ | 0.05 | $X_5$ | 0.02 |
| | | $X_6$ | 0.03 |

COMPUTING SYSTEM AND METHOD FOR APPLYING MONTE CARLO ESTIMATION TO DETERMINE THE CONTRIBUTION OF INDIVIDUAL INPUT VARIABLES WITHIN DEPENDENT VARIABLE GROUPS ON THE OUTPUT OF A DATA SCIENCE MODEL

BACKGROUND

An increasing number of technology areas are becoming driven by data and the analysis of such data to develop insights. One way to do this is with data science models that may be created based on historical data and then applied to new data to derive insights such as predictions of future outcomes.

In many cases, the use of a given data science model is accompanied by a desire to explain the output of the model, such that an appropriate action might be taken in view of the insight provided. However, many data science models are extremely complex and the manner by which they derive insights can be difficult to analyze. For example, it may not be apparent how the output of a data science model was affected, if at all, by a given input variable of the data science model. Therefore, it can be difficult to interpret what input variables had the greatest effect on the output generated by the model, a task made even more complicated when considering the dependency among groups of input variables.

OVERVIEW

Disclosed herein is a new technique for determining contribution values for groups of dependent input variables on the output of a trained data science model.

In one aspect, the disclosed technology may take the form of a method to be carried out by a computing platform that involves (i) training a model object for a data science model using a machine learning process, wherein the model object is trained to (a) receive an input data record comprising a set of input variables and (b) output a score for the input data record, (ii) arranging the set of input variables into two or more variable groups based on dependencies between respective input variables, where each variable group comprises at least one input variable, (iii) identifying a given input data record to be scored by the model object, (iv) for each respective variable group of the model object, determine a contribution value for the respective variable group, (v) for each respective input variable in each respective variable group of the model object, perform a given number of iterations of: (a) identify a sample historical data record from a set of historical data records, (b) determine a first model object output score for the sample historical data record, (c) use the given input data record to determine a second model object output score for the sample historical data record that is conditioned on the respective variable group in the given input data record, (d) select a random variable coalition, within the respective variable group, comprising the respective input variable and zero or more other input variables, (e) use the given input data record, the sample historical data record, and the randomly-selected variable coalition to compute a group-specific contribution value for the respective input variable in the respective group, and (f) use (1) the contribution value for the respective variable group, (2) the first model object output score, (3) the second model object output score, and (4) the group-specific contribution value for the respective input variable to compute an iteration-specific contribution value for the respective input variable to the model output, and (vi) for each respective variable group of the model object, aggregating the iteration-specific contribution values calculated for each iteration and thereby determine an aggregated contribution value for the respective variable group.

In some example embodiments, selecting a random variable coalition, within the respective variable group, comprising the respective input variable and zero or more other input variables may involve generating a random ordering of the two or more input variables within the respective variable group and defining the random variable coalition as including the respective input variable and all other input variables that precede the respective input variable in the generated random ordering.

Further, in example embodiments, using the given input data record, the sample historical data record, and the randomly-selected variable coalition to compute a group-specific contribution value for the respective input variable in the respective group may involve (i) generating a first synthetic data record comprising a mix of input variables from (a) the given input data record and (b) the sample historical data record, (ii) generating a second synthetic data record comprising an adjusted mix of input variables from (a) the given input data record and (b) the sample historical data record, (iii) using the trained model object to determine a first score for the first synthetic data record and a second score for the second synthetic data record, and (iv) calculating a difference between the first score and the second score, wherein the difference is the group-specific contribution value.

Further yet, in example embodiments, generating the first synthetic data record comprising the mix of input variables may involve (i) identifying a subset of input variables that are included in the randomly-selected group coalition, (ii) for the identified subset of input variables, using values from the given input data record for the first synthetic data record, and (iii) for each other input variable, using values from the sample historical data record for the first synthetic data record. Further, generating the second synthetic data record comprising the adjusted mix of input variables may involve, (i) for the identified subset of input variables, excluding the respective input variable, using values from the given input data record for the second synthetic data record, and (ii) for each other input variable, including the respective input variable, using values from the sample historical data record for the second synthetic data record.

Still further, in some example embodiments, aggregating the iteration-specific contribution values calculated for each iteration may involve determining an average of the iteration-specific contribution values for each iteration over the given number of iterations.

Still further, in some example embodiments, performing the given number of iterations for each respective input variable in each respective variable group of the model object may involve, while performing the given number of iterations for a first input variable of the model object, performing the given number of iterations for each other input variable of the model object.

Still further, in some example embodiments, the given number of iterations is 1,000 or more iterations.

Still further, in some example embodiments, identifying the sample historical data record from a set of historical data records may involve identifying a randomly-sampled historical data record from the set of historical data records.

In yet another aspect, disclosed herein is a computing platform that includes a network interface for communicating over at least one data network, at least one processor, at least one non-transitory computer-readable medium, and

3 program instructions stored on the at least one non-transitory computer-readable medium that are executable by the at least one processor to cause the computing platform to carry out the functions disclosed herein, including but not limited to the functions of the foregoing method.

In still another aspect, disclosed herein is a non-transitory computer-readable medium provisioned with program instructions that, when executed by at least one processor, cause a computing platform to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 1 depicts a simplified block diagram illustrating an example computing environment in which a data science model may be utilized.

FIG. 3 is a flow chart that illustrates one possible example of a process for calculating quotient Shapley (QSHAP) values in accordance with the present disclosure;

FIG. 5 is a flow chart that illustrates another possible example of a process for calculating quotient Shapley (QSHAP) values in accordance with the present disclosure;

FIG. 7 is a simplified illustration of a set of contribution values that may be determined for groups of dependent input variables and individual input variables within the groups for a model object.

DETAILED DESCRIPTION

Figure 2:
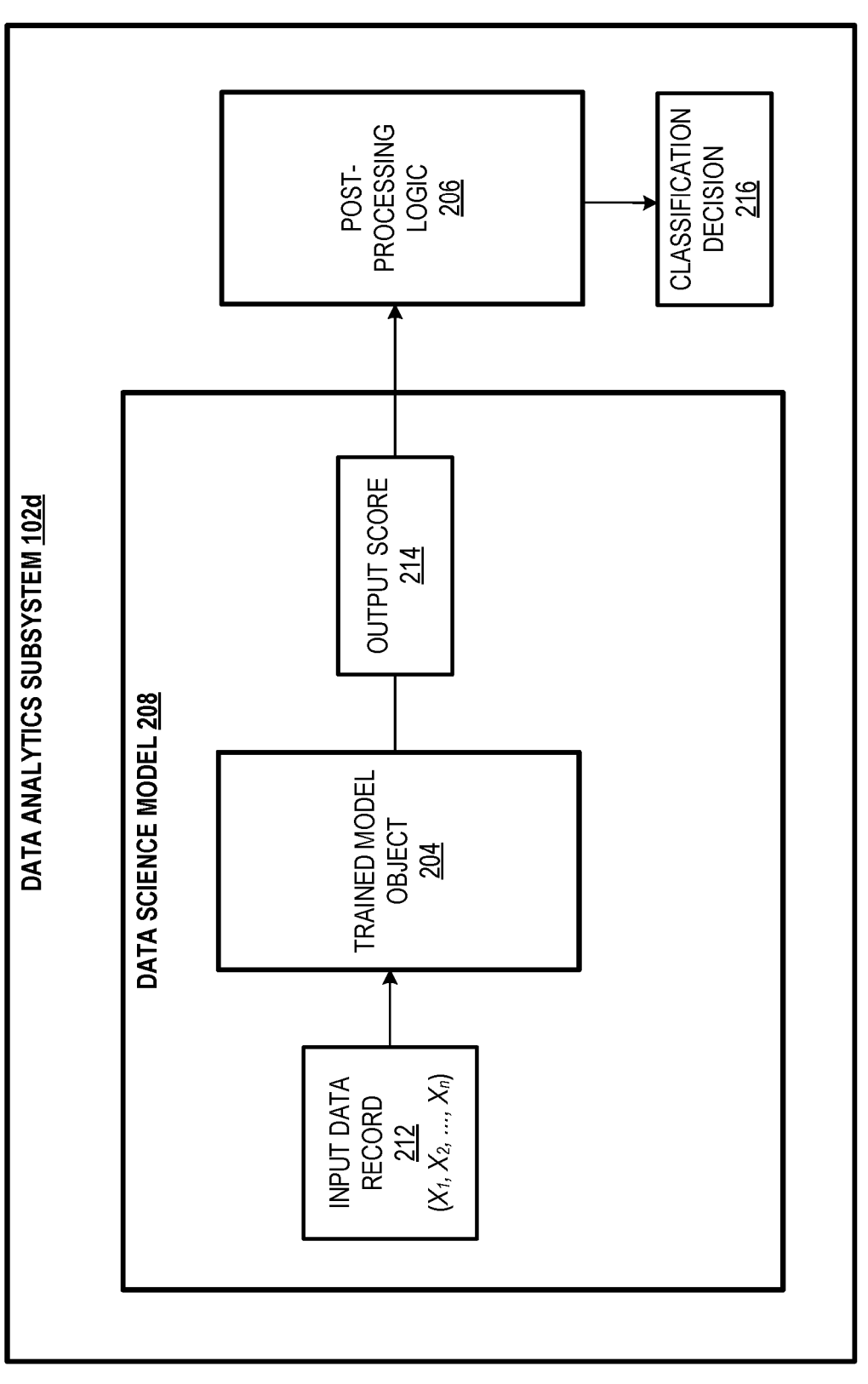
FIG. 2 depicts a simplified block diagram illustrating an example data science model that may be executed by a software subsystem of a computing platform according to aspects of the disclosed technology.

Organizations in various industries have begun to utilize data science models to derive insights that may enable those organizations, and the goods and/or services they provide, to operate more effectively and/or efficiently. The types of insights that may be derived in this regard may take numerous different forms, depending on the organization utilizing the data science model and the type of insight that is desired. As one example, an organization may utilize a data science model to predict the likelihood that an industrial asset will fail within a given time horizon, based on operational data for the industrial asset (e.g., sensor data, actuator data, etc.). As another example, data science models may be used in a medical context to predict the likelihood of a disease or other medical condition for an individual, and/or the result of a medical treatment for the individual.

As yet another example, many organizations have begun to utilize data science models to help make certain business decisions with respect to prospective or existing customers of those companies. For instance, as one possibility, an organization may utilize a data science model to help make decisions regarding whether to extend a service provided by that organization to a particular individual. One example may be an organization that provides financial services such as loans, credit card accounts, bank accounts, or the like, which may utilize a data science model to help make decisions regarding whether to extend one of these financial services to a particular individual (e.g., by estimating a risk level for the individual and using the estimated risk level as a basis for deciding whether to approve or deny an application submitted by the individual). As another possibility, an organization may utilize a data science model to help make decisions regarding whether to target a particular individual when engaging in marketing of a good and/or service that is provided by the company (e.g., by estimating a similarity of the individual to other individuals who previously purchased the good and/or service). As yet another possibility, a company may utilize a data science model to help make decisions regarding what terms to offer a particular individual for a service provided by the organization, such as what interest rate level to offer a particular individual for a new loan or a new credit card account. Many other examples are possible as well.

Figure 1:
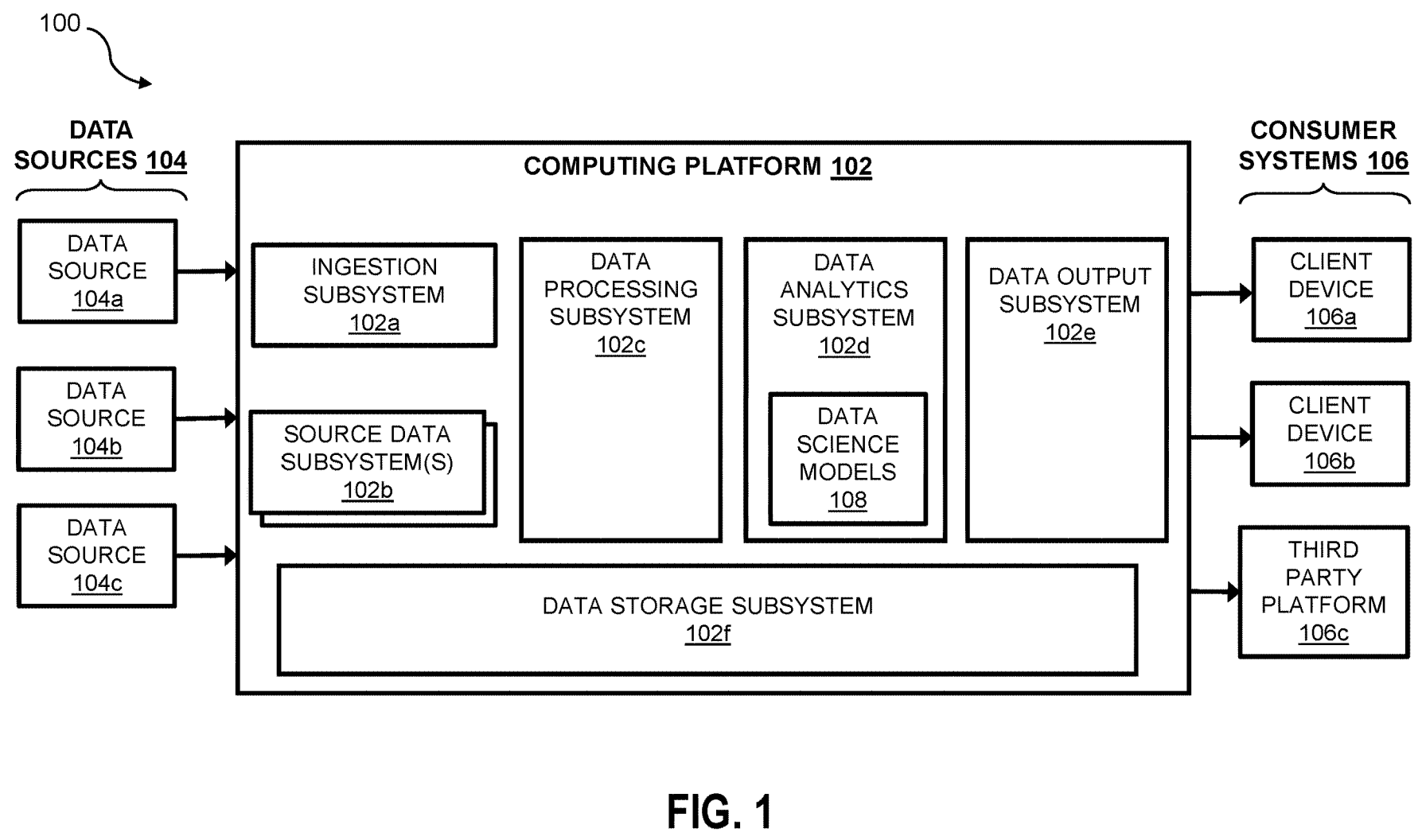

One illustrative example of a computing environment 100 in which an example data science model such as this may be utilized is shown in FIG. 1. As shown, the example computing environment 100 may include a computing platform 102 associated with a given organization, which may comprise various functional subsystems that are each configured to perform certain functions in order to facilitate tasks such as data ingestion, data generation, data processing, data analytics, data storage, and/or data output. These functional subsystems may take various forms.

For instance, as shown in FIG. 1, the example computing platform 102 may comprise an ingestion subsystem 102a that is generally configured to ingest source data from a particular set of data sources 104, such as the three representative data sources 104a, 104b, and 104c shown in FIG. 1, over respective communication paths. These data sources 104 may take any of various forms, which may depend at least in part on the type of organization operating the example computing platform 102.

Further, as shown in FIG. 1, the example computing platform 102 may comprise one or more source data subsystems 102b that are configured to internally generate and output source data that is consumed by the example computing platform 102. These source data subsystems 102b may take any of various forms, which may depend at least in part on the type of organization operating the example computing platform 102.

Further yet, as shown in FIG. 1, the example computing platform 102 may comprise a data processing subsystem 102c that is configured to carry out certain types of processing operations on the source data. These processing operations could take any of various forms, including but not limited to data preparation, transformation, and/or integration operations such as validation, cleansing, deduplication, filtering, aggregation, summarization, enrichment, restructuring, reformatting, translation, mapping, etc.

Still further, as shown in FIG. 1, the example computing platform 102 may comprise a data analytics subsystem 102d that is configured to carry out certain types of data analytics operations based on the processed data in order to derive insights, which may depend at least in part on the type of organization operating the example computing platform 102. For instance, in line with the present disclosure, data analytics subsystem 102*d* may be configured to execute data science models 108 for rendering decisions related to the organization's business, such as a data science model for deciding whether to extend a service being offered by the organization to an individual within a population (e.g., a financial service such as a loan, a credit card account, a bank account, etc.), a data science model for deciding whether to target an individual within a population when engaging in marketing of a good and/or service that is offered by the organization, and/or a data science model for deciding what terms to extend an individual within a population for a service being offered by the organization, among various other possibilities. In practice, each such data science model 108 may comprise a model object that was trained by applying a machine learning process to a training dataset, although it should be understood that a data science model could take various other forms as well.

Referring again to FIG. 1, the example computing platform 102 may also comprise a data output subsystem 102*e* that is configured to output data (e.g., processed data and/or derived insights) to certain consumer systems 106 over respective communication paths. These consumer systems 106 may take any of various forms.

For instance, as one possibility, the data output subsystem 102*e* may be configured to output certain data to client devices that are running software applications for accessing and interacting with the example computing platform 102, such as the two representative client devices 106*a* and 106*b* shown in FIG. 1, each of which may take the form of a desktop computer, a laptop, a netbook, a tablet, a smartphone, or a personal digital assistant (PDA), among other possibilities. These client devices may be associated with any of various different types of users, examples of which may include individuals that work for or with the organization (e.g., employees, contractors, etc.) and/or individuals seeking to obtain goods and/or services from the organization. As another possibility, the data output subsystem 102*e* may be configured to output certain data to other third-party platforms, such as the representative third-party platform 106*c* shown in FIG. 1.

In order to facilitate this functionality for outputting data to the consumer systems 106, the data output subsystem 102*e* may comprise one or more Application Programming Interface (APIs) that can be used to interact with and output certain data to the consumer systems 106 over a data network, and perhaps also an application service subsystem that is configured to drive the software applications running on the client devices, among other possibilities.

The data output subsystem 102*e* may be configured to output data to other types of consumer systems 106 as well.

Referring once more to FIG. 1, the example computing platform 102 may also comprise a data storage subsystem 102*f* that is configured to store all of the different data within the example computing platform 102, including but not limited to the source data, the processed data, and the derived insights. In practice, this data storage subsystem 102*f* may comprise several different data stores that are configured to store different categories of data. For instance, although not shown in FIG. 1, this data storage subsystem 102*f* may comprise one set of data stores for storing source data and another set of data stores for storing processed data and derived insights. However, the data storage subsystem 102*f* may be structured in various other manners as well. Further, the data stores within the data storage subsystem 102*f* could take any of various forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, and/or streaming event queues, among other possibilities.

The example computing platform 102 may comprise various other functional subsystems and take various other forms as well.

In practice, the example computing platform 102 may generally comprise some set of physical computing resources (e.g., processors, data storage, communication interfaces, etc.) that are utilized to implement the functional subsystems discussed herein. This set of physical computing resources take any of various forms. As one possibility, the computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, the example computing platform 102 may comprise "on-premises" computing resources of the organization that operates the example computing platform 102 (e.g., organization-owned servers). As yet another possibility, the example computing platform 102 may comprise a combination of cloud computing resources and on-premises computing resources. Other implementations of the example computing platform 102 are possible as well.

Further, in practice, the functional subsystems of the example computing platform 102 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

It should be understood that computing environment 100 is one example of a computing environment in which a data science model may be utilized, and that numerous other examples of computing environment are possible as well.

Most data science models today comprise a trained model object (sometimes called a trained "regressor") that is configured to (i) receive input data for some set of input variables, (ii) evaluate the input data, and (iii) based on the evaluation, output a "score" (e.g., a likelihood value). For at least some data science models, the score is then used by the data science model to make a classification decision, typically by comparing the score to a specified score threshold, depending on the application of the data science model in question.

These types of trained model objects are generally created by applying a machine learning process to a training dataset that is relevant to the particular type of classification decision to be rendered by the data science model (e.g., a set of historical data records that are each labeled with an indicator of a classification decision based on the historical data record). In this respect, the machine learning process may comprise any of various machine learning techniques, examples of which may include regression techniques, decision-tree techniques, support vector machine (SVM) techniques, Bayesian techniques, ensemble techniques, gradient descent techniques, and/or neural network techniques, among various other possibilities.

FIG. 2 depicts a conceptual illustration of a data science model 208 for making a classification decision 216 for an input data record 212 in accordance with the present disclosure, which may also be referred to herein as a "classification" model. In the example of FIG. 2, the data science model 208 is shown as being deployed within the example computing platform 102 of FIG. 1, and in particular the data analytics subsystem 102*d* of the computing platform 102 of FIG. 1, but it should be understood that the data science model 208 may be deployed within any computing platform that is capable of executing the disclosed data science model 208.

The type of classification decision that is made by the data science model 208 shown in FIG. 2 may take various forms, as noted above. However, for the purposes of FIG. 2 and the examples that follow, the data science model 208 will be referred to as a model for estimating the risk associated with a given individual in order to make a decision regarding whether to extend a service being offered by an organization to the individual (e.g., a financial service such as a loan, a credit card account, a bank account, etc.).

As shown in FIG. 2, the data science model 208 may include a trained model object 204 that functions to receive the input data record 212. The input data record 212 includes data for a set of input variables (sometimes also referred to as "feature variables," "features," or "predictors") that are used by the trained model object 204 and are represented in FIG. 2 by the set of variables $(X_1, X_2, \ldots, X_n)$. In this regard, the input data record 212 may include data corresponding to a given individual for whom a classification decision will be made, and may generally comprise data for any variables that may be predictive of the risk associated with the given individual (e.g., variables that provide information related to credit score, credit history, loan history, work history, income, debt, assets, etc.).

In some implementations, the data science model 208 may initially receive source data (e.g., from one or more of the data sources 104 shown in FIG. 1) that may not correspond directly to the input variables used by the trained model object 204, and/or may include extraneous data that is not used by the trained model object 204, and so on. In these situations, the data science model 208 may first apply pre-processing logic (not shown) to derive, from the source data, the data for the particular input variables that are used by the trained model object 204. In other implementations, the data processing subsystem 102*c* shown in FIG. 1 may receive the source data from which the input variables are derived, and may perform some or all of the pre-processing logic discussed above before passing the result to the data analytics subsystem 102*d* and the data science model 208. Other implementations are also possible.

Once the input data record 212 including the input variables $(X_1, X_2, \ldots, X_n)$ is received by the trained model object 204 as input, the trained model object 204 may evaluate the input variables. Based on the evaluation, the trained model object 204 may determine and output a score 214 that represents the risk associated with the given individual. For example, the output score 214 may represent a likelihood (e.g., a value between 0 and 1) that the given individual will default on a loan if the loan is extended to the given individual. As further shown in FIG. 2, the data analytics subsystem 102*d* may then apply post-processing logic 206 to the output score 214 of the data science model 208 in order to render a classification decision 216. For instance, if the output score 214 is above a given high-risk threshold, the data analytics subsystem 102*d* may render a decision not to extend the loan to the individual (e.g., to deny the individual's application for the loan). As another possibility, if the output score 214 is below the given high-risk threshold, and additionally below a given preferred-rate threshold, the data analytics subsystem 102*d* may render a decision to approve the individual's loan application at a lower interest rate than may be offered to another approved individual for whom the trained model object 204 output a score above the preferred-rate threshold. Various other examples are also possible.

There are various advantages to using a data science model comprising a trained model object over other forms of data analytics that may be available. As compared to human analysis, data science models can drastically reduce the time it takes to make decisions. In addition, data science models can evaluate much larger datasets (e.g., with far more input variables) while simultaneously expanding the scope and depth of the information that can be practically evaluated when making decisions, which leads to better-informed decisions. Another advantage of data science models over human analysis is the ability of data science models to reach decisions in a more objective, reliable, and repeatable way, which may include avoiding any bias that could otherwise be introduced (whether intentionally or subconsciously) by humans that are involved in the decision-making process, among other possibilities.

Data science models may also provide certain advantages over alternate forms of machine-implemented data analytics like rule-based models (e.g., models based on user-defined rules). For instance, unlike most rule-based models, data science models are created through a data-driven process that involves analyzing and learning from historical data, and as a result, data science models are capable of deriving certain types of insights from data that are simply not possible with rule-based models-including insights that are based on data-driven predictions of outcomes, behaviors, trends, or the like, as well as other insights that can only be revealed through an understanding of complex interrelationships between multiple different data variables. Further, unlike most rule-based models, data science models are capable of being updated and improved over time through a data-driven process that re-evaluates model performance based on newly-available data and then adjusts the data science models accordingly. Further yet, data science models may be capable of deriving certain types of insights (e.g., complex insights) in a quicker and/or more efficient manner than other forms of data analytics such as rule-based models. Depending on the nature of the available data and the types of insights that are desired, data science models may provide other advantages over alternate forms of data analytics as well.

When using a data science model comprising a trained model object, there may be a need to quantify or otherwise evaluate the extent to which the model object's different input variables contribute to the model object's output. This type of analysis of the contribution (sometimes also referred to as attribution) of the input variables to a model's output may take various forms.

For instance, it may be desirable in some situations to determine which input variable(s) contribute most heavily to a decision made based on a model object's output on a prediction-by-prediction basis. Additionally, or alternatively, it may be desirable in some situations to determine which input variable(s) contribute most heavily, on average, to the decisions made based on a model object's output over some representative timeframe.

As one example, and referring to the discussion of FIG. 2 above, financial services companies that deny applications for credit (e.g., loan applications) are subject to regulations that require the companies to inform the denied individuals as to which factors contributed most to that decision. In this regard, the factors provided to the applicant can be referred to as Model Reason Codes (MRCs), sometimes referred to as simply "reason codes." Consequently, a financial services company that utilizes a data science model to make these types of classification decisions must also be prepared to interpret the resulting decisions and identify the corresponding reason codes.

As another example, an organization that manages industrial assets may want to determine the input variable(s) that contributed most to a failure prediction for a given asset. For instance, an input variable corresponding to particular sensor data or actuator data gathered from the industrial asset may have the greatest contribution to the predicted failure. This information, in turn, may then help guide the remedial action that may be taken to avoid or fix the problem before the failure occurs in the given asset and/or in other similarly situated assets.

As yet another example, a medical organization that uses data science models to predict the likelihood of disease or other medical conditions for individuals may want to determine the input variable(s) that contributed most to the model's output score for a given individual. This information may then be used to make judgments about the treatments for the individual that may be effective to reduce the likelihood of the disease or medical condition.

Another situation where it may be desirable to analyze the contribution of a model object's input variables to the model's output is to determine which input variable(s) contribute most heavily to a bias exhibited by the model object. At a high level, this may generally involve (i) using the model object to score input datasets for two different subpopulations of people (e.g., majority vs. minority subpopulations), (ii) quantifying the contributions of the input variables to the scores for the two different subpopulations, and (iii) using the contribution values for the two different subpopulations to quantify the bias contribution of the variables.

Further details regarding these and other techniques for determining which input variable(s) contribute most heavily to a bias exhibited by a model object can be found in U.S. patent application Ser. No. 17/900,753, which was filed on Aug. 31, 2022 and is entitled "COMPUTING SYSTEM AND METHOD FOR CREATING A DATA SCIENCE MODEL HAVING REDUCED BIAS" and which is incorporated herein by reference in its entirety.

To this end, several techniques have been developed for quantifying the contribution of a trained model object's input variables. These techniques, which are sometimes referred to as "interpretability" techniques or "explainer" techniques, may take various forms. As one example, a technique known as Local Interpretable Model-agnostic Explanations (LIME) uses a linear function as a local approximation for a model object, and then uses the linear function as a surrogate model for explaining the output. Another example technique is Partial Dependence Plots (PDP), which utilizes the model object directly to generate plots that show the impact of a subset of the input variables in the overall input data record (also referred to as the "predictor vector") on the output of the model object. PDP is similar to another technique known as Individual Conditional Expectation (ICE) plots, except an ICE plot is generated by varying a single input variable given a specific instance of the input variable, whereas a PDP plot is generated by varying a subset of the input variables after the complementary set of variables has been averaged out. Another technique known as Accumulated Local Effects (ALE) takes PDP a step further and partitions the predictor vector space and then averages the changes of the predictions in each region rather than the individual input variables.

Yet another explainer technique is based on the game-theoretic concept of the Shapley value (Shapley, 1953). Given a cooperative game with n players, a set function v that acts on a set N:={1, 2, . . . n} and satisfies v(ø)=0, the Shapley values assigns contributions to each player i∈ N to the total payoff v(N), and is given by $$\phi_i[N, v] = \sum_{S \subseteq N \setminus \{i\}} \frac{s! \, (n-s-1)!}{n!} (v(S \cup \{i\}) - v(S)), \quad \text{(Eq. 1)}$$

$$s := |S|, \, n := |N|$$

by considering all the different combinations between a player i and the rest of the players.

In the machine learning (IL) setting, the features X=(X₁, X₂, . . . Xₙ) are viewed as n players with an appropriately designed game v(S; x, X, f) where x is an observation (a predictor sample from the training dataset of features Dₓ), X is a random vector of features, and f corresponds to the model object and S⊆N. The choice of the game is crucial for a game-theoretic explainer (see Miroshnikov et al. 2021); it determines the meaning of the attribution (explanation) value. Two of the most notable games in the ML literature are the conditional and marginal games given by $$v^{CE}(S; x, X, f) = \mathbb{E}[f(X)|X_S = x_S] \text{ and} \quad \text{(Eq. 2)}$$

$$v^{ME}(S; x, X, f) = \mathbb{E}[f(x_S, X_{-S})] \quad \text{(Eq. 3)}$$

introduced in Lundberg and Lee (2017). Shapley values of the conditional game—i.e., conditional Shapley values— explain predictions f(X) viewed as a random variable, while Shapley values for the marginal game—i.e., marginal Shapley values—explain the (mechanistic) transformations occurring in the model f(x).

In practice, conditional or marginal games are typically replaced with their empirical analogs that utilize data samples. Computing conditional game values is, in general, infeasible when the predictor dimension is large considering the curse of dimensionality. The marginal game, however, is often approximated with the empirical marginal game $\hat{v}^{ME}$ (S; x, $\bar{D}_x$, f) given by $$\hat{v}^{ME}(S; x, \bar{D}_X, f) := \frac{1}{|\bar{D}_X|} \sum_{\bar{x} \in \bar{D}_X} f(x_S, \bar{x}_{-S}) \quad \text{(Eq. 4)}$$

where $\bar{D}_x$ is a background dataset of vector of features, a subset of the dataset $D_X$ containing a vector of features X used for training (e.g., the input data record 212 shown in FIG. 2, including samples of input variables X₁, X₂, . . . X, stored in $D_X$).

The marginal Shapley value $\phi_i[v^{ME}]$ of the feature indexed by i, that is the Shapley value for the game $v^{ME}$(S; x, X, f), takes into account all the different combinations between a feature of interest (e.g., the input variable whose contribution is to be determined) and the rest of the features in the input vector and produces a score (e.g., a scalar value)

that represents the contribution of that feature value to the deviation of the model prediction for the specific instance of the input vector from the model's average prediction. The empirical marginal Shapley value $\phi_i[v^{ME}]$ is the statistical approximant of $\phi_i[v^{ME}]$, which has complexity of the order $O(2^n \cdot |\overline{D}_x|)$, the number of terms in the Shapley formula times the number of evaluations over the size of the dataset $\overline{D}_x$.

In the remaining parts of the document when we refer to Shapley values (or marginal Shapley values), we mean the Shapley values $\phi_i[v^{ME}]$, $i=1, 2, \ldots n$, of the empirical marginal game and we denote them by $$\phi_i^{ME} \text{ or } \phi_i^{ME}(x)$$

where we suppress the information on the model f, the random variable X and the set of predictors N.

Marginal Shapley values, as discussed herein, generate individual contributions of predictor values. It will be appreciated that the marginal Shapley value is, in general, impossible to compute because it requires knowledge of the distribution of X. While the evaluation of the empirical marginal game $\hat{v}^{ME}$ (S; $x,\overline{D}_x,f$) is relatively cheap (if the background dataset is small), to evaluate the empirical marginal Shapley value itself is expensive to compute because the Shapley value formula contains the summation over all coalitions $S \subseteq N$, leading to $2^n$ terms. The complexity can then become extreme if the number of features n is large. If the background dataset is large (e.g., it is chosen to be the training dataset) then evaluating the empirical marginal game alone also becomes expensive.

It will be appreciated that, given the grouping of input variables by a clustering algorithm as a starting point (as discussed in further detail below) and due to the additivity property of Shapley values, we can assign the Shapley value of a group of input variables to be the sum of the Shapley values of each variable in the group. Specifically, if $S \subseteq N=\{1,2,\ldots,n\}$ is an index set that specifies the variables in one group, the group Shapley value $\phi_L[v]$ (for any game v on N) is given by:

$$\phi_S[v] = \sum_{i \in S} \phi_i[v] \qquad \text{(Eq. 5)}$$

One practical implementation of using Shapley values to quantify variable contributions is an algorithm referred to as kernel SHAP, described in Lundberg et al., "S. M. Lundberg and S.-I. Lee, A unified approach to interpreting model predictions", 31st Conference on Neural Information Processing Systems, (2017), which is incorporated by reference herein in its entirety. KernelSHAP is utilized to compute the marginal Shapley value for each input variable. The KernelSHAP method approximates Shapley values for the marginal game (in view of the assumption on feature independence made by the authors) via a weighted least square problem and it is still very expensive computationally when the number of predictors is large.

Another algorithm, called TreeSHAP, introduced in Lundberg et al., "Consistent individualized feature attribution for tree ensembles," ArXiv, arxiv:1802.03888 (2019), which is incorporated by reference herein in its entirety, is utilized to compute the Shapley value of a specially designed tree-based game which mimics the conditioning of the model by utilizing the tree-based model structure. The (path-dependent) TreeSHAP algorithm is a fast method, but in general it produces neither marginal nor conditional Shapley values (nor their approximants) when dependencies between predictors exist. In terms of complexity, the path-dependent algorithm runs in $O(T \cdot L \cdot \log(L)^2)$ time, where T is the number of trees comprising the model and L is the maximum number of leaves. For one to obtain marginal Shapley values, an adaptation of the TreeSHAP algorithm was proposed called Independent (or Interventional) Tree-SHAP, described in Lundberg et al., "From local explanations to global understanding with explainable AI for trees", Nature Machine Intelligence 2, 56-67 (2020), which is incorporated herein by reference in its entirety. It is not as fast as the path-dependent version of the algorithm since it must average over a background dataset $\overline{D}_x$ to compute the empirical marginal expectations. However, the complexity is linear in the number of samples, and specifically Independent TreeSHAP has complexity $O(T \cdot |D_x| \cdot L)$, where again T is the number of trees and L is the maximum number of leaves. Note that the values produced by TreeSHAP are model-specific and, in the case of the path-dependent algorithm, they depend on the make-up of the tree-model $f(x)$ in terms of trees: for two different make-ups of some tree-based model $f(x)$, the attribution values will in general differ, which is not always desirable for an application such as the production of reason codes.

In practice, both KernelSHAP or TreeSHAP algorithms can be utilized to compute the (Shapley value-based) attribution for each group of input variables defined by the clustering algorithm (e.g., PROC VARCLUS clustering algorithm), which is done by computing the attribution for each individual input variable using the KernelSHAP or TreeSHAP algorithm and then summing the attributions across each group in line with Equation 5 above. Once the group attribution value is calculated for each group of input variables, the groups of input variables can be ranked in descending order of Shapley values. It is important to emphasize again that KernelSHAP is limited in its application when the number of features is large and TreeSHAP is limited because it is a model-specific algorithm and its path-dependent version produces attributions that are not guaranteed to be conditional Shapley values.

In general, a marginal Shapley value may represent, for a given data record x that was scored by a trained model object $f(x)$, a value (e.g., an "explainer" value) for each input variable that indicates the input variable's contribution to the model's output score for the given data record. For example, if a trained model object is a regressor score (i.e., a probability value with value between 0 and 1) a marginal Shapley value may be expressed as a number between $-1$ and 1, with a positive value indicating a positive contribution to the output and a negative value indicating a negative contribution to the output. Further, the magnitude of the marginal Shapley value may indicate the relative strength of its contribution.

In this regard, it will be understood that a marginal Shapley value for a given input variable must be interpreted in view of how the data science model defines its output. Returning to the example discussed in FIG. 2 above, the model object 204 may be trained to output a score that indicates a risk level of an individual, where a higher score indicates a higher risk. Accordingly, a positive Shapley value for any of the input variables $X_1$, $X_2$, . . . X, in FIG. 2 would indicate that the input variable contributed to pushing the risk score higher. On the other hand, a negative Shapley value for any of the input variables $X_1, X_2, \ldots X$, would indicate that the input variable contributed to pushing the risk score lower.

One important difference between the marginal and conditional Shapley values is that the marginal values (unlike conditional Shapley values) are in general not stable in any natural data-based metrics with respect to a change of the model (unless feature variables are independent, in which case the marginal and conditional Shapley values are equal and hence both stable). This means that under dependencies in predictors X, for two trained models that have similar predictions (on average), the marginal Shapley values between the models may differ significantly (on average). This fact has been rigorously established in the paper entitled "Mutual information-based group explainers with coalition structure for ML model explanations" by Miroshnikov et al. (2021), which has a last revised date of Oct. 5, 2022 and can be found at https://arxiv.org/abs/2102.10878, which is incorporated herein by reference in its entirety.

It is important to emphasize that one of the drawbacks of the explainer techniques discussed above is that they fail to account for dependencies between input variables (this is relevant to both KernelSHAP and TreeSHAP). KernelSHAP generally treats all input variables as independent, which may not be the case in practice, while TreeSHAP relies on the structure of the regression trees that make up the model and its path-dependent version only partially respects dependencies.

One approach that allows to alleviate the difference between the marginal and conditional perspectives is an approach based on grouping predictors by dependencies and computing the attribution of the group by summing marginal Shapley values across each group as described above; such an approach is presented in the article of K. Aas et al. "Explaining individual predictions when features are dependent more accurate approximations to Shapley values", Artificial Intelligence, 298 (2021). It has been observed by the authors of Aas et al. that forming groups by dependencies alleviates the inconsistencies and approximates the sums of conditional Shapley values. However, as shown in Miroshnikov et al. (2021), summing marginal Shapley values guarantees neither the stability (and consistency with data) nor equality with the sums of conditional Shapley values.

To address these and other shortcomings with the techniques discussed above, a model object's input variables can be arranged into groups based on their dependencies (e.g., using a clustering algorithm) such that within groups, predictors are dependent but across groups there are little to no dependencies (e.g., any dependency is below a threshold value). Once these groups are formed, their contributions can then be quantified using a game-theoretical explainer technique (based on the marginal game) that is capable of quantifying the contribution of variable groups, which guarantees that the marginal explanations of the group are equal to that of conditional ones. This approach may also be referred to as a group explainer technique.

One such technique that applies this approach for determining the contribution value of a group of dependent variables is a technique based on Shapley value of the quotient marginal game, a game that treats groups as players. In this technique, the input variables $X_1, X_2, \ldots X_n$ are partitioned into r groups given by partition $\mathcal{P} = \{S_1, S_2, \ldots, S_r\}$ based on their dependencies. Shapley values are then determined for the quotient marginal game defined by $$v^{ME,\mathcal{P}}(A; x, X, f) = v^{ME}\left(\bigcup_{j \in A} S_j; x, X, f\right) \text{ where } A \subseteq R, \qquad \text{(Eq. 6)}$$

$$R = \{1, 2, \ldots, r\},$$

involving the partitioned groups of input variables. This application of Shapley values in a quotient marginal game, which may also be referred to as QSHAP, gives the contribution $\phi_j^{ME,\mathcal{P}}$ of a group $X_{S_j}, \in R = \{1, 2, \ldots, r\}$ as:

$$\phi_j^{ME,\mathcal{P}} = \phi_j[R, v^{ME,\mathcal{P}}(A; x, X, f)], R = \{1, 2, \ldots r\}. \qquad \text{(Eq. 7)}$$

By empirical QSHAP we mean the Shapley value of the empirical quotient marginal game $$\phi_j[R, \hat{v}^{ME,\mathcal{P}}(A; x, \bar{D}_X, f)],$$

which, in principle, can be computed in practice using the Shapley formula directly. A group-specific Shapley value contribution of the feature $X_i$ where i belongs to the group of interest $S_j$ is defined as Shapley value of the marginal game restricted to the elements of the group of interest $S_j$ and denoted by $$\phi_{i,S_j}^{ME} = \phi_i[S_j, v^{ME,\mathcal{P}}(A; x, X, f)], i \in S_j. \qquad \text{(Eq. 8)}$$

It will be appreciated that determining a contribution value, based on the QSHAP technique noted above, for a variable group that includes multiple input variables does not provide one with contribution values for individual input variables within the group, which may be desirable in some applications. Where individual contribution values are desired, a two-step procedure may be used that determines contribution values for individual input variables within the groups of the partition $\mathcal{P}$. One example of a contribution value for individual input variables that may be calculated in this way is a two-step Shapley value, or two-step SHAP value, which is obtained by playing a coalitional game that treats the individual input variables within a given variable group as players, nested within a quotient marginal game that treats the groups themselves as players. In particular, determination of a two-step SHAP value for an input variable of interest generally involves determining the sum of the input variable's group-specific Shapley value and an equal share of the surplus that is obtained by the variable's group coalition in the quotient marginal game. Accordingly, determining a two-step SHAP value involves first determining the QSHAP value for the group of interest that includes the input variable of interest.

However, it can be difficult or impossible to apply a QSHAP technique or to determine two-step SHAP values in practice, as the number of calculations that must be performed by the model object increases exponentially based on the number of variable groups r and the number of input variables n that are present in the input data record, even for a small dataset $D_X$. To illustrate, many data science models in operation today may be configured to analyze a hundred or more input variables in a given input data record, which might be partitioned into thirty or more variable groups. Determining an empirical QSHAP value in this context requires calculations numbering on the order of $2^{30}$ times the size of the dataset, and determining an empirical two-step SHAP value requires calculations that may be several orders of magnitude greater, depending on the distribution of input variables within the variable groups. This, in turn, may result in an exponential increase in the amount computational resources and ultimately, the amount of time that is required to determine a group contribution value for just a single group or a single variable. In applications where contribution values are desired within a relatively short period of time after a given data science model renders a classification decision (e.g., generating an MRC upon denying a loan application), waiting an extended period of time for the techniques defined above to perform an exact computation may not be a practical solution.

In view of the aforementioned issues, disclosed herein is a new technique for approximating two-step SHAP values for individual input variables of a trained model object using Monte Carlo sampling on a product probability space of random coalitions and data records of features. As noted above, one component of a two-step SHAP analysis involves the determination of QSHAP values, which can also be approximated using Monte Carlo sampling, which will also be discussed herein.

At a high level, Monte Carlo sampling generally involves the aggregation of repeated randomly sampled observations in order to obtain numerical results. In this regard, using Monte Carlo sampling to determine a two-step SHAP value for a variable of interest $X_1$ within a variable group of interest $S_1$ from the partition $\{S_1, \ldots S_r\}, j \in \{1, \ldots, r\}=R$, in an input data record x*, with a background dataset $\overline{D}_x$ chosen as the training dataset $D_X$, may begin with an approximation the QSHAP value $\phi_j^{ME,\mathcal{P}}$ for the variable group of interest $S_j$, which can be viewed as an expected value of $$f\left(x^*_{S_A \cup S_j}, X_{-(S_A \cup S_j)}\right) - f\left(x^*_{S_A}, X_{-S_A}\right) \qquad \text{(Eq. 9)}$$

where $f$ is a trained model object, and $S_A := \cup_{k \in A} S_k$, where $A \subseteq R \dagger\{j\}$ is a random coalition not containing the group of interest j. The probability of selecting A, or equivalently A $\cup \{j\}$, is given by the corresponding coefficient in the Shapley formula for r players, i.e., by $$\frac{(r-|A|-1)!|A|!}{r!},$$

and X is a random vector of features.

The difference reflected above in Equation 9 describes an effect of the variable group of interest in an input data record on the model object's output. The Monte Carlo sampling repeatedly evaluates the above difference by selecting sequentially an observation from the background dataset $D_X$ and randomly (non-uniformly) sampling a group coalition according to the distribution described above. After iterating a given number of times (e.g., 1000 times), the results may be averaged to produce an approximation of the QSHAP value for the variable group of interest S). Each of these elements will be discussed in greater detail below.

In addition to approximating the QSHAP value for the variable group of interest $S_j$, the two-step SHAP analysis involves an approximation of the group-specific Shapley value $$\phi_{i,S_j}^{ME}$$

of the variable of interest $X_1$ within the group of interest $S_j$, which can be viewed as an expected value of $$f\left(x^*_{B \cup \{i\}}, X_{-B \cup \{i\}}\right) - f(x^*_B, X_{-B}) \qquad \text{(Eq. 10)}$$

where $B \subseteq S_j \{i\}$ is a random variable coalition contained in $S_j$ not containing the variable of interest i. Similar to the randomly-selected group coalition discussed above, the probability of selecting B, or equivalently B $\cup \{i\}$, is given by the corresponding coefficient in the Shapley formula for $|S_j|$ players, where the number of players is equal to the number of input variables in the group of interest $S_j$ that contains $X_i$, i.e., by $$\frac{(|s_j|-|B|-1)!|B|!}{|s_j|!}.$$

As above, X is a random vector of features.

Once the QSHAP value for the variable group of interest $S_j$ and group-specific Shapley value of the variable of interest $X_i$ are defined as above, the two-step SHAP value $$TS_i^{ME,\mathcal{P}}$$

for the variable of interest $X_i$ is defined by $$TS_i^{ME,\mathcal{P}} = \phi_{i,S_j}^{ME} + \frac{1}{|S_j|}\left(\phi_j^{ME,\mathcal{P}} - v^{ME}(S_j) + v^{ME}(\phi)\right) \qquad \text{(Eq. 11)}$$

where $$\phi_{i,S_j}^{ME}$$

represents the group-specific Shapley value of the variable of interest $X_i$ and where $\phi_j^{\mathcal{P},ME}$ is the QSHAP value as noted above. As a consequence, $TS_i^{\mathcal{P},ME}$ can be viewed as an expected value of $$\left(f\left(x^*_{B \cup \{i\}}, X_{-B \cup \{i\}}\right) - f(x^*_B, X_{-B})\right) + \frac{1}{|S_j|} \qquad \text{(Eq. 12)}$$
$$\left(f\left(x^*_{S_A \cup S_j}, X_{-(S_A \cup S_j)}\right) - f\left(x^*_{S_A}, X_{-S_A}\right) - f\left(x^*_{S_j}, X_{-S_j}\right) + f(X)\right),$$

where, as above $f$ is a trained model object, and $S_A := \cup_{k \in A} S_k$, where $A \subseteq R \dagger\{j\}$ is a random coalition not containing the group of interest j, and where $B \subseteq S_j \dagger \{i\}$ is a random variable coalition not containing the variable of interest i. The probability of selecting A, or equivalently A $\cup \{j\}$, is given by the corresponding coefficient in the Shapley formula for r players, i.e., by $$\frac{(r - |A| - 1)!|A|!}{r!}.$$

Similarly, the probability of selecting B, or equivalently B ∪ {i}, is given by the corresponding coefficient in the Shapley formula for $|S_j|$ players, where the number of players is equal to the number of input variables in the group of interest that contains $X_i$, i.e., by $$\frac{(|S_j| - |B| - 1)!|B|!}{|S_j|!},$$

and X is a random vector of features. Further, $$\mathbb{E}\left[f\left(x_{S_j}^*, X_{-S_j}\right)\right],$$

which may also be expressed as $\bar{f}^j$, represents the expected output of the trained model object $f$ evaluated at the vector $$\left(x_{S_j}^*, X_{-S_j}\right)$$

where $X_{-S_j}$ is a random vector of features not in the group of interest $S_j$ conditioned on the group of interest $S_j$, and $\mathbb{E}[f(X)]$, which may also be expressed as $\bar{f}$, represents the expected output of the trained model object $f$ evaluated at the random vector of features X. The difference between these two expected outputs of the model object $f$ represents an effect of the variable group of interest $S_j$ alone on the output of $f$, and does not include any of the coalitional value obtained by the group in the quotient marginal game. In turn, subtracting this difference from the QSHAP value $\phi_j^{P,ME}$ which does include the coalitional value of the group $S_j$, yields the surplus coalitional value of the group $S_j$ obtained in the quotient marginal game. This surplus is then divided evenly among the members of group $S_j$, such that the share that is attributable to the variable of interest $X_i$ is given by the ratio $$\frac{1}{|S_j|},$$

as shown in Equation 12. Accordingly, adding this equal share of the surplus to $$\phi_i^{ME}$$

yields the two-step SHAP value for the variable of interest $X_i$.

It will be noted that for a variable group $S_j$ that includes only a single input variable, the QSHAP value for the group $S_j$ will also be the two-step SHAP value for the single input variable within the group. Under these circumstances, the additional calculations above to resolve the other terms in Equation 12 need not be performed, and thus the total number of calculations to determine two-step SHAP values may be advantageously reduced.

Similar to the approximated QSHAP value above, for all input variables within a variable group that includes at least one other input variable, the Monte Carlo sampling repeatedly evaluates the formula in Equation 12 above by sequentially selecting an observation from the background dataset $\overline{D}_x$ and randomly (non-uniformly) sampling an input variable coalition, within the variable group $S_j$, according to the distribution described above. After iterating a given number of times (e.g., 1000 times), the results may be averaged to produce an approximation of the two-Step SHAP value for the variable of interest.

Monte Carlo sampling is associated with various inherent properties that may be advantageous when applied to the determination of QSHAP and two-step SHAP values as discussed herein. For instance, so long as there is sufficient data to sample from—which will generally be the case in a data science modeling application, in the form of training data that was used to train the model object—and the variance of the function described by the model is bounded, then the estimation error in a Monte Carlo analysis scales with the number of iterations that are performed, that is, one is able to control the estimation error of the population limit (e.g., the QSHAP values for the original marginal game $v^{ME}$). For example, given a risk score model object $f(x)$ that has values in [0,1], the expected relative error rate of estimating an empirical marginal Shapley value of size a E [0,1] or higher by performing 10,000 iterations will be 1% given that the estimated variance of the Monte Carlo samples is $\alpha^2$, regardless of the number of input variables or variable groups involved. Accordingly, there is a quantifiable tradeoff between a desired level of accuracy in the determination of QSHAP and two-step SHAP values (e.g., an error rate of 1%, 5%, etc.) versus the computational demands and time required to perform the corresponding number of iterations, which may allow an organization to customize a Monte Carlo analysis to best suit its particular needs. Furthermore, the calculations are easily parallelizable, and the complexity is independent of the number of input variables or variable groups involved.

By applying Monte Carlo sampling in this way, the new techniques discussed herein allow for the calculation of QSHAP and two-step SHAP values in a more efficient manner that requires fewer calculations, fewer computational resources, and less time than an exact computation would otherwise require. As a result, the techniques discussed herein unlock the ability to determine contribution values for individual input variables that also contemplates the dependency of input variables to a given model object, and in a way that is model agnostic (e.g., is not limited to tree-based models).

Turning to FIG. 3, a flow chart is shown that illustrates one example of a process 300 for approximating quotient marginal Shapley (QSHAP) values using Monte Carlo sampling techniques in accordance with the present disclosure. The example process 300 of FIG. 3 may be carried out by any computing platform that is capable of creating a data science model, including but not limited the computing platform 102 of FIG. 1. Further, it should be understood that the example process 300 of FIG. 3 is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 3, the example process 300 may begin at block 302 with the computing platform training a model object for a data science model that is to be deployed by an organization for use in making a particular type of decision. In general, this model object may comprise any model object that is configured to (i) receive an input data record related to a respective individual for a particular set of input variables (which may also be referred to as the model object's "features" or the model object's "predictors"), (ii) evaluate the received input data record, and (iii) based on the evaluation, output a score that is then used make the given type of decision with respect to the respective individual. Further, the specific model object model that is trained may take any of various forms, which may depend on the particular data science model that is to be deployed.

For instance, as one possibility, the model object that is trained at block 302 may comprise a model object for a data science model to be utilized by an organization to decide whether or not to extend a particular type of service (e.g., a financial service such as a loan, a credit card account, a bank account, or the like) to a respective individual within a population. In this respect, the set of input variables for the model object may comprise data variables that are predictive of whether or not the organization should extend the particular type of service to a respective individual (e.g., variables that provide information related to credit score, credit history, loan history, work history, income, debt, assets, etc.), and the score may indicate a likelihood that the organization should extend the particular type of service to the respective individual, which may then be compared to a threshold value in order to reach a decision of whether or not to extend the particular type of service to the respective individual.

The function of training the model object may also take any of various forms, and in at least some implementations, may involve applying a machine learning process to a training dataset that is relevant to the particular type of decision to be rendered by the data science model (e.g., a set of historical data records for individuals that are each labeled with an indicator of whether or not a favorable decision should be rendered based on the historical data record). In this respect, the machine learning process may comprise any of various machine learning techniques, examples of which may include regression techniques, decision-tree techniques, support vector machine (SVM) techniques, Bayesian techniques, ensemble techniques, gradient descent techniques, and/or neural network techniques, among various other possibilities.

For the remaining blocks of the process 300 shown in FIG. 3, an ongoing example will be discussed that uses a consistent notation to help illustrate various aspects of the Monte Carlo sampling techniques discussed herein. In particular, assume that the model object that was trained in block 302 was trained using a dataset $D_X$ that includes one thousand input data records, such that $D_X=\{x^{(1)}, \ldots, x^{(1000)}\}$, with $x^{(i)} \in \mathbb{R}^7$. We assume that the background dataset is chosen to be the training set, that is $\overline{D}_X=D_X$, and we assume that $D_X$ has been randomly shuffled. Further, assume that the trained model object is configured to receive an input vector X that includes the input variables $X_1$, $X_2$, $X_3$, . . . , $X_6$. In this regard, the model object may be represented as a function $f(x_1, x_2, x_3, x_4, x_5, x_6)=f(x)$ that outputs a score for a given input data record that includes values for each of the input variables.

At block 304, after training the model object for the data science model, the computing platform may arrange the model object's input variables into two or more variable groups based on dependencies (e.g., based on the mutual information shared between the input variables), where each variable group comprises at least one input variable. In this respect, the computing platform may utilize any technique now known or later developed to group the model object's input variables together based on such dependencies, including but not limited to any of various possible clustering techniques.

For instance, as one possibility, the computing platform may group the model object's input variables together utilizing a clustering technique that is based on Maximal Information Coefficient (MIC) values, which are a regularized version of mutual information that provide measures of the dependency strengths between different pairs of variables. For example, an MIC value for a pair of input variables that is near or at 0 indicates that there is little or no dependency between the pair of input variables (i.e., the input variables are independent of one another), whereas an MIC value for a pair of input variables that is at or near 1 indicates that there is a strong dependency between the pair of input variables (i.e., the input variables are dependent of one another).

In order to cluster based on these MIC values, the computing platform may begin by determining a respective MIC value for each possible pair of input variables in the model object's set of input variables based on an analysis of a training dataset (e.g., the training dataset that was used to train model object). Next, the computing platform may (i) translate the MIC values into dissimilarity values (e.g., by taking the complement of the MIC values) and then (ii) input those dissimilarity values into an agglomerative clustering algorithm that functions to cluster the input variables in a "bottom up" manner by initially treating each input variable as a single-variable cluster, and then during each iteration of the algorithm, merging a selected pair of clusters (e.g., the pair of clusters having the a smallest intergroup dissimilarity) into a combined cluster. Such an algorithm may continue to iterate until all of the input variables have been merged into one combined cluster, and the result is a dendrogram (also referred to as a partition tree) that encodes the strength of the dependencies between the input variables in terms of hierarchal tree of clusters, where the height of the line that connects two lower-level clusters represents the dissimilarly between the lower-level clusters. After the dendrogram has been produced, the computing platform may apply a threshold dissimilarity value to the dendrogram in order to cut the tree at a given height and thereby define a particular set of input-variable clusters that satisfy the threshold dissimilarity value, which may then be utilized as the variable groups that are defined based on dependencies.

Figure 4A:
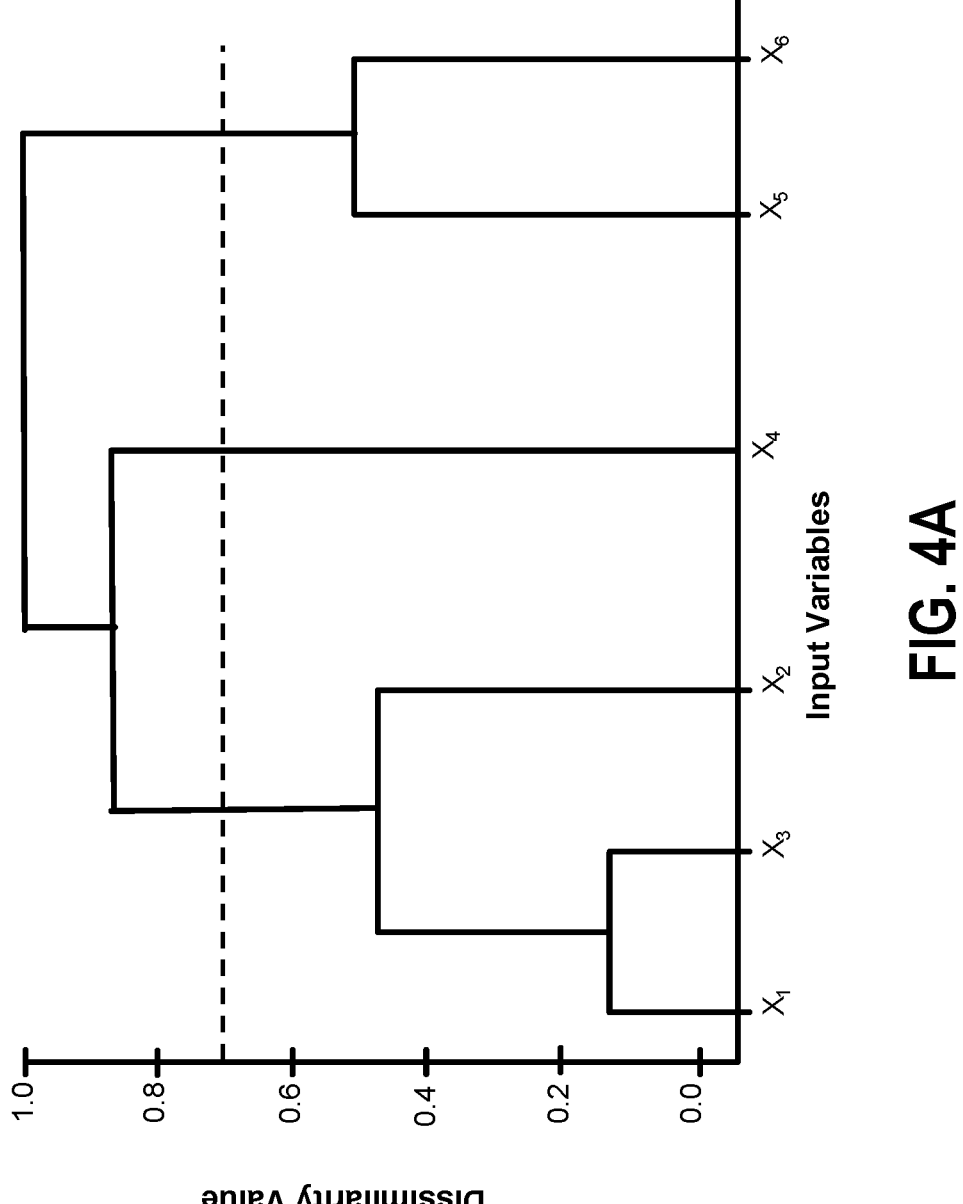
FIG. 4A is a schematic diagram showing one possible example of a dendrogram that may be produced for a model object's input variables in accordance with the present disclosure.

One possible example of such a dendrogram for the example set of input variables $X_1$, $X_2$, $X_3$, $X_4$, $X_5$, and $X_6$ can be seen in FIG. 4A. As shown in FIG. 4A, the given set of input variables has been arranged into a partition tree, and a threshold dissimilarity value of approximately 0.7 has then been applied to the partition tree in order to define a set of three clusters—a first cluster comprising $X_1$, $X_2$, and $X_3$, a second cluster comprising only $X_4$, and a third cluster comprising $X_5$, and $X_6$. In such an example, the computing platform may arrange the model object's input variables in accordance with these three partitions, or groups, and then use these three groups when performing the Monte Carlo sampling. For purposes of the ongoing example being discussed in conjunction with FIG. 3, these groups may be identified as belonging to a partition $\mathcal{P}=\{S_1, S_2, S_3\}$ that includes groups $S_1$, $S_2$, and $S_3$, respectively.

Figure 4B:
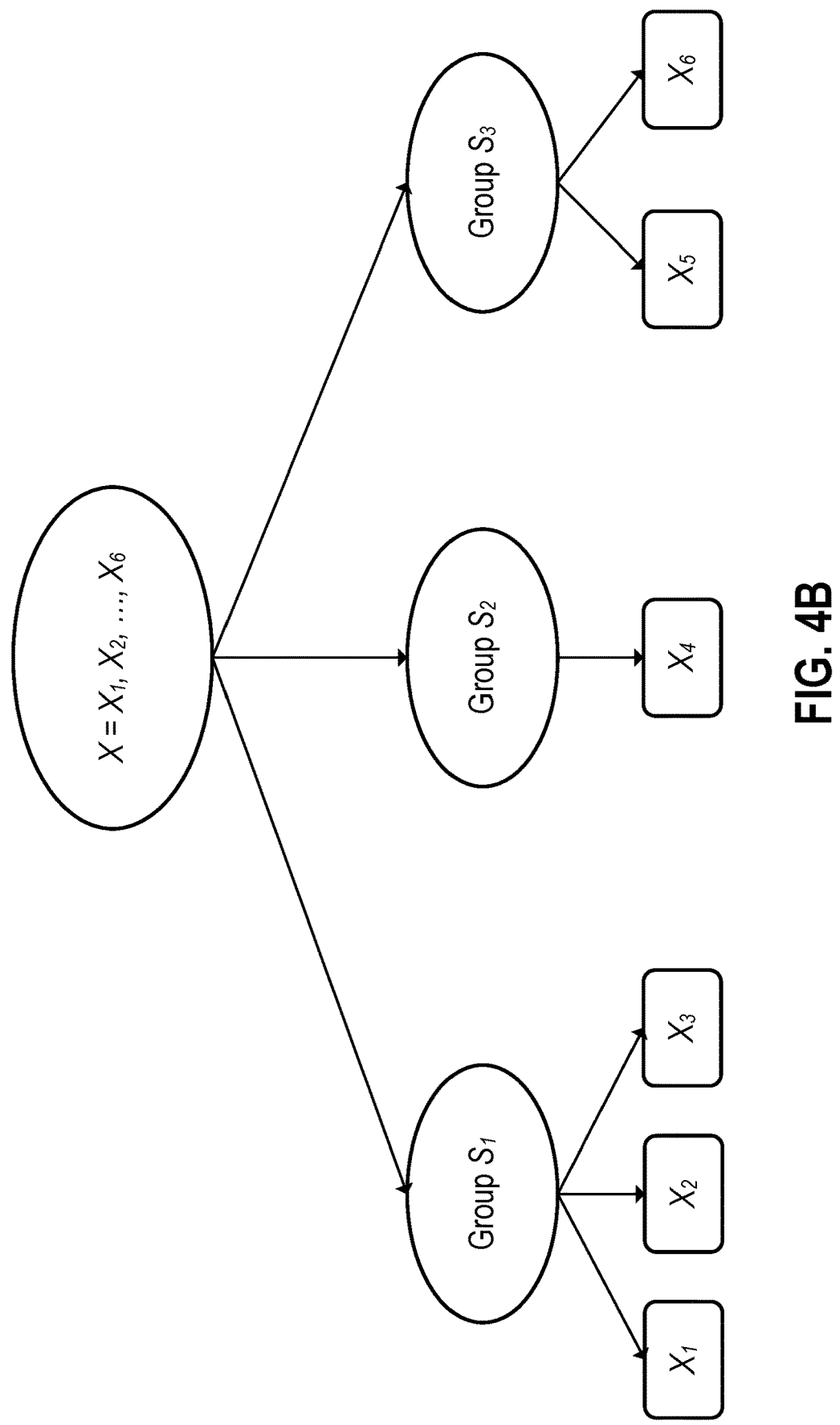
FIG. 4B is a schematic diagram showing an example grouping of a model object's input variables based on dependencies between the input variables.

Turning to FIG. 4B, a visual example showing the results of the grouping operation can be seen. As shown in FIG. 4B, the input variables in the input vector X have been arranged into three groups, $S_1$, $S_2$ and $S_3$, based on their dependencies.

It should be understood that the discussion above and the dendrogram shown in FIG. 4A illustrate the result of just one possible example of an MIC-based clustering technique, and that other MIC-based clustering techniques could also be utilized to group the model object's input variables together based on dependencies—including but not limited to clustering techniques that are based on divisive clustering rather than agglomerative clustering.

As another possibility, the computing platform may group the model object's input variables together utilizing a clustering technique that is based on principal component analysis (PCA) (e.g., the PROC VARCLUS clustering technique developed by SAS®). According to one such PCA-based clustering technique, the computing platform may begin by assigning each of the model object's input variables to a single cluster, generating a covariance matrix for the model object's input variables based on an analysis of a training dataset (e.g., the training dataset that was used to train model object), and then utilizing the generated covariance matrix to split the single cluster of input variables into two clusters of input variables. The computing platform may then iteratively repeat this process in a "top down" manner for each resulting cluster until all clusters include only a single input variable, which forms a tree structure representing the relationships between the input variables. In turn, the computing platform may then combine clusters of input variables within the tree structure together into a group if the correlation between the input variables in the clusters is above a threshold. However, it should be understood that this is just one possible example of a PCA-based clustering technique, and that other PCA-based clustering techniques could also be utilized to group the model object's input variables together based on dependencies.

The computing platform could also utilize other clustering techniques to group the model object's input variables together based on their dependencies.

Further details regarding these and other techniques for grouping a model object's input variables together based on dependencies can be found in (i) U.S. patent application Ser. No. 16/868,019, which was filed on May 6, 2020 and is entitled "SYSTEM AND METHOD FOR UTILIZING GROUPED PARTIAL DEPENDENCE PLOTS AND SHAPLEY ADDITIVE EXPLANATIONS IN THE GENERATION OF ADVERSE ACTION REASON CODES," and (ii) U.S. patent application Ser. No. 17/322,828, which was filed on May 17, 2021 and is entitled "SYSTEM AND METHOD FOR UTILIZING GROUPED PARTIAL DEPENDENCE PLOTS AND GAME-THEORETIC CONCEPTS AND THEIR EXTENSIONS IN THE GENERATION OF ADVERSE ACTION REASON CODES," each of which is incorporated herein by reference in its entirety, and (iii) the paper entitled "Mutual information-based group explainers with coalition structure for ML model explanations" by Miroshnikov et al. (2021), incorporated by reference above.

At block 306, the computing platform may identify a given input data record that is to be scored by the model object, and for which the input variable group contribution values are to be determined. The computing platform may identify the given input data record in various ways. For instance, the given input data record may correspond to an individual that is applying for a service (e.g., a loan) that is provided by a financial services company, and the computing platform may receive the given input data record as part of the application process. The computing platform may identify the given input data record in other ways as well.

For purposes of notation in the ongoing example, the given input data record and the values associated with its input variables may be represented by $$x^* = (x_1^*, x_2^*, x_3^*, x_4^*, x_5^*, x_6^*).$$

Starting at block 308, given a number M of Monte Carlo iterations that is less than or equal to the size of the dataset of historical records $D_X$, the computing platform may begin running an iterative Monte Carlo loop for each variable group, shown by sub-blocks 308a-308c, that operates to generate observations (e.g., one observation per iteration) that at iteration $k \in \{1, \ldots, M\}$ are based on both a randomly selected coalition of variable groups as well as the k-th selected sample from the dataset $D_X$. In some implementations, the number of iterations M may be a default value (e.g., M=1000, M=5000, etc.) set by the organization or individual that is utilizing the data science model in question. In other implementations, the number of iterations may be customizable by a user, among other possibilities.

Additionally, the computing platform may select a variable group on which to begin the Monte Carlo analysis, which may be referred to herein as the current group of interest. In some implementations, the computing platform may simply begin with the first variable group, here group $S_1$, and then move to the next group sequentially when the contribution value for the first variable group is complete, such that the next group becomes the current group of interest. In other implementations, as suggested above, the computing platform may run an iterative Monte Carlo loop for some or all variable groups in parallel, such that the contribution values for multiple groups of interest are determined concurrently. Other examples for how the computing platform may select one or more current groups of interest are also possible.

At block 308a, at the k-th iteration, the computing platform selects the k-th sample $x^{(k)}$ the computing platform may identify a random sample from a set of historical data records. Accordingly, the sample $x^{(k)}$ may include respective values for the trained model object's six input variables that may be represented by $$x^{(k)} = x_1^{(k)}, x_2^{(k)}, x_3^{(k)}, x_4^{(k)}, x_5^{(k)}, x_6^{(k)}.$$

At block 308b, the computing platform may select a random group coalition that includes the current group of interest and zero or more other groups. For example, in the ongoing example discussed above, the computing platform has arranged the input variables into three groups, $S_1$, $S_2$, and $S_3$. Assuming that the current group of interest for the Monte Carlo loop is $S_1$, there are four possible coalitions that might be selected, including (i) a coalition with $S_2$, (ii) a coalition with $S_3$, (iii) a coalition with both $S_2$ and $S_3$, or (iv) a coalition with neither $S_2$ nor $S_3$ (i.e., a coalition with $S_1$ by itself).

The computing platform may select the random group coalition (distributed according to the probabilities given by the corresponding coefficients of the Shapley value formula with 3 players, i.e., the probabilities presented above in relation to Equation 9) in various ways. As one possibility, the computing platform may generate a random ordering of the groups that were determined at block 304. Then, the computing platform may select the random coalition based on the position of the current group of interest within the random ordering. For instance, the computing platform may select the coalition that includes the current group of interest and any other group(s) that precede it within the random ordering.

Applying this to the example above, where the three variable groups are $S_1$, $S_2$, and $S_3$, the computing platform may generate a random ordering of $S_2$, $S_1$, $S_3$. Accordingly, the computing platform may select the coalition that includes group $S_1$ and group $S_2$, because $S_2$ precedes $S_1$ in the random ordering. Alternatively, if $S_1$ were in the last position in the random ordering, the selected coalition would include all three groups. Further, if $S_1$ were in the first position in the random ordering, the selected coalition would include $S_1$ by itself, because neither of the other two groups would precede it in the random ordering.

The randomly-selected group coalition may be determined in other equivalent ways as well. For instance, one variation may involve the computing platform generating a random ordering of groups as discussed above, but then selecting the coalition that includes the current group of interest and any other group(s) that follow it within the random ordering. As another possibility, the computing platform may first generate the size of the group coalition k $\in$ {0, 1,2, 3, . . . r} using the binomial distribution Binom (r−1, p=0.5), where r is the size of the partition $\mathcal{P}$, then generate a list of all possible group coalitions of size k and then randomly select a group coalition from the list. Other possibilities also exist.

As will be appreciated with reference to the discussion above, the random selection of a group coalition approximates the theoretical goal of a Shapley value, which attempts to take into account all possible coalitions between a feature of interest (here, the current group of interest) and the other features in the input vector (here, the other variable groups). Instead of performing a computation for every possible coalition, the computing platform utilizes Monte Carlo sampling to select a random coalition, for a random sample of predictors obtained from the list of observations in the background dataset, over enough iterations that the marginal Shapley value (here, a QSHAP value) can be estimated with a high degree of accuracy, as long as the number M of Monte Carlo iterations can be set large enough.

It should be noted that the random selection of a group coalition at block 308*b* is non-uniform. This is because the probability of occurrence of each possible group coalition must correspond to the probability given by the corresponding coefficients of the Shapley value formula with r players, where r is the number of groups. Therefore, when selecting the random group coalition as discussed at block 308*b*, the computing platform must apply a weight to each potential coalition such that the probability that a given coalition will be randomly selected corresponds to the coefficient of the Shapley value formula with r players; specifically, a coalition of groups A S {1, . . . r} corresponding to the union of features $S=\cup_{j\in A}\ S_j$, has a probability of occurrence $$\frac{(r-|A|-1)!|A|!}{r!}.$$

Other implementations for selecting a random group coalition in a way that incorporates the probability of each coalition are also possible.

In view of blocks 308*a* and 308*b* of FIG. 3, it will be appreciated that the Monte Carlo analysis discussed herein is selecting observations consecutively from the dataset $D_X$ and performing non-uniform random sampling of the group coalitions that are the elements of the partition P simultaneously with each iteration. This approach advantageously avoids the need to calculate a double summation, which would be the case if one constructed an estimator by iterating separately through historical records and then through coalitions.

At block 308*c*, at the k-th Monte Carlo iteration, the computing platform may use the input data record, the k-th historical data record, and the randomly-selected group coalition to compute an iteration-specific contribution value for the current group of interest. At a high level, this computation may involve determining the difference between (i) an expected output of the model object for a first synthetic input data record that includes the current group of interest included in the randomly-selected group coalition and (ii) an expected output of the model object for a second synthetic input data record where the current group of interest is removed from the coalition. This computation may be carried out in various ways and may involve various sub-steps, some examples of which will be described below.

First, at the k-th Monte Carlo iteration, the computing platform may generate a first synthetic data record that includes a mix of input variables from (i) the given input data record (i.e., the given input data record identified at block 306) and (ii) the k-th historical data record (i.e., the observation identified at block 308*a*). The mix of variables between these two data records may be dictated by the randomly-selected group coalition (i.e., the coalition randomly selected at block 308*b*).

For instance, at k-th iteration, generating the mix of input variables for the first synthetic data record may involve identifying the subset of the model object's input variables that are included in the randomly-selected group coalition, which as noted above will include the current group of interest and zero or more other groups. For this identified subset of input variables, the computing platform may use the values for each input variable from the given input data record. Then, for all other input variables that were not included in the identified subset (i.e., the input variables that were not included in the group coalition), the computing platform may use the values for each input variable from the k-th historical data record.

In this way, the first synthetic data record may, when it is input into the trained model object, result in an output score that includes the contribution of the current group of interest within the randomly-selected group coalition.

In a similar way, the computing platform may generate a second synthetic data record. As above, the second synthetic data record may include a mix of input variables from (i) the given input data record and (ii) the k-th historical data record. The mix of variables between these two data records may again be dictated by the randomly-selected group coalition-however, the mix of input variables may be adjusted with respect to the first synthetic data record to remove the contribution of the current group of interest.

For instance, generating the adjusted mix of input variables for the second synthetic data record may involve identifying the subset of the model object's input variables that are included in the randomly-selected group coalition, but ignoring the current group of interest. As noted above, the remaining groups in the coalition may include zero or more other groups. For this identified subset of input variables excluding input variables in the current group of interest, the computing platform may use the values for each input variable from the given input data record. Then, for all other input variables, including input variables in the current group of interest, the computing platform may use the values for each input variable from the k-th historical data record. In this regard, when generating the adjusted mix of input variables, the computing platform may use values from the k-th historical data record for the input variables that were not included in the group coalition, as discussed above, but also for the input variables included in the current group of interest, which are not included in the second synthetic data record.

In this way, the second synthetic data record may, when it is input into the trained model object, result in an output score that removes the contribution of the current group of interest within the randomly-selected group coalition.

Accordingly, the computing platform may use the given model object to generate an output score for each of the two synthetic data records and then calculate the difference between the two scores. This difference may represent the iteration-specific contribution value for the current group of interest.

Applying this to the ongoing example discussed above, where the model object is represented by a function $f(x_1, \ldots, x_6)$, the variable groups are divided according to a partition P that includes groups $S_1$, $S_2$, and $S_3$, where $S_1$ is the current group of interest, $x^*$ represents the given input data record, $x^{(k)}$ represents the k-th historic data record, and the randomly-sampled group coalition (not containing $S_1$) is the coalition $S_2$, the iteration-specific contribution value calculated at iteration k for the current group of interest $S_1$ may be given by the following:

$$\phi_1^{ME,\mathcal{P},k} = f\left(x_{S_2 \cup S_1}^*, x_{S_3}^{(k)}\right) - f\left(x_{S_2}^*, x_{S_1 \cup S_3}^{(k)}\right) \qquad \text{(Eq. 13)}$$

As discussed above, this equation calculates a difference between the model outputs for two synthetically created data records, which serves to isolate the contribution of the current group of interest $S_1$. Expanding this equation to include the specific variables in each term may be given by the following:

$$\phi_1^{ME,\mathcal{P},k} = f\left(x_1^*, x_2^*, x_3^*, x_4^*, x_5^{(k)}, x_6^{(k)}\right) - f\left(x_1^{(k)}, x_2^{(k)}, x_3^{(k)}, x_4^*, x_5^{(k)}, x_6^{(k)}\right) \text{ (Eq. 14)}$$

As can be seen by reviewing this expanded equation, the values for the input variables corresponding to the current group of interest $S_1$, (i.e., the input variables $X_1$, $X_2$, and $X_3$), are taken from the given input data record $x^*$ in the first term of the difference (i.e., the first synthetic data record), but are then replaced by values taken from the k-th historic data record $x^{(I)}$ in the second term of the difference (i.e., the second synthetic data record).

As noted above, the blocks 308a-308c and the resulting calculations presented here represent a single iteration of the Monte Carlo loop, represented by k in the Equations 13 and 14, which the computing platform will perform a total of M times. Thus, the process 300 shown in FIG. 3 returns to block 308a for a next iteration, where the next observation from the list of historical data records is selected, another random group coalition (e.g., a different random group coalition) is selected, and so on, until a next iteration-specific contribution value for the current group of interest is determined.

At block 310, after all iteration-specific contribution values for the current group of interest are calculated, the computing platform may aggregate the iteration-specific contribution values calculated for each iteration and thereby determine an aggregated contribution value for the current group of interest. This aggregated contribution value represents the estimated QSHAP value for the current group of interest.

The computing platform may perform the aggregation in block 310 in various ways. For instance, the computing platform may determine an average of all the iteration-specific contribution values, across all iterations for the current group of interest. This aggregation may be represented by the following:

$$\overline{\phi}_j^{ME,\mathcal{P}} = \frac{1}{M}\sum_{k=1}^{M}\phi_j^{ME,\mathcal{P},k} \qquad \text{(Eq. 15)}$$

The computing platform may determine the aggregated contribution value from the iteration-specific contribution values in other ways as well.

As will be appreciated from the discussion above, the Monte Carlo loop beginning at block 308 in FIG. 3, including M iterations of consecutively selected historical data records and randomly-selected group coalitions, is performed for each respective variable group that was determined at block 304. Accordingly, to complete the example above and thereby determine the contribution values for each variable group in the given input data record $x^*$, the preceding steps would be duplicated using the group $S_2$ as the current group of interest and duplicated again using the group $S_3$ as the current group of interest.

Although the total number of calculations to be performed for the Monte Carlo analysis of QSHAP values discussed here may be relatively large depending on the number of input variables and variable groups that are formed, it should be noted that, because the calculations are largely independent of each other (i.e., they do not depend on each other's results), the Monte Carlo analysis lends itself to parallel computing. For instance, the computing platform may run a respective Monte Carlo loop, represented by blocks 308a-308c in FIG. 3, for all variable groups of a given model object simultaneously. Thus, if computing resources adapted to undertake this type of parallel computing (e.g., one or more graphics processing units (GPUs)) are available, the total time required to perform the Monte Carlo analysis discussed herein may be kept relatively low, even for a large number of calculations that may be required for a large number of groups.

Turning to FIG. 5, a flow chart is shown that illustrates another example of a process 500 that may be utilized for approximating QSHAP values using Monte Carlo sampling techniques in accordance with the present disclosure. Similar to the example process 300 of FIG. 3, the example process 500 of FIG. 5 may be carried out by any computing platform that is capable of creating a data science model, including but not limited the computing platform 102 of FIG. 1. Further, it should be understood that the example process 500 of FIG. 5 is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

As shown in FIG. 5, the example process 500 may begin at blocks 502 and 504 that may be substantially similar to (e.g., the same as) blocks 302 and 304 of the example process 300. For instance, the computing platform may train a model object (e.g., using the training dataset $D_X$) for a data science model that is to be deployed by an organization for use in making a particular type of decision, and may arrange the model object's input variables into two or more variable groups based on dependencies, as discussed in the examples above.

However, unlike the example process 300, in which the computing platform identifies the k-th historical data record and selects a random group coalition (at blocks 308a and 308b) for the k-th iteration of the Monte Carlo loop, for each new input data record to be scored, the example process 500 may involve the computing platform generating, at block 505, a dataset $D_{MC}$ of selected pairs, formed by iterating through consecutive data records and pairing each one with a random coalition, and then re-using the dataset $D_{MC}$ to conduct the Monte Carlo loop for each new input data record that is scored by the trained model object.

To generate the dataset $D_{MC}$, the computing platform may, at block 505a, identify the k-th sample from a set of historical data records, such as the training dataset $D_X$, as generally discussed above with respect to block 308a. Further, at block 505b, the computing platform may select a random group coalition according to one or more of the techniques discussed above with respect to block 308b.

At block 505c, the computing platform may save the selected data record and random coalition as a (data record, coalition) pair in the dataset $D_{MC}$. The computing platform may then return to block 505a and repeat the loop, each time adding another (data record, coalition) pair to the dataset $D_{MC}$. In this regard, the computing platform may repeat the loop enough times that the number of pairs in the dataset $D_{MC}$ is greater than or equal to the number of iterations M that are expected to be performed during the Monte Carlo analysis for each input data record. For example, a dataset $D_{MC}$ that includes 10,000 pairs may be utilized for a Monte Carlo analysis that performs 10,000 or fewer iterations. Other examples are also possible.

At block 506, the computing platform may identify a given input data record that is to be scored by the model object, and for which the input variable group contribution values are to be determined, similar to block 306 of the example process 300.

Then, starting at block 508, the computing platform may begin running an iterative Monte Carlo loop for each variable group of the model object that, at the k-th iteration, operates to generate an observation that is based on both a randomly selected coalition of variable groups as well as the k-th selected sample from the dataset. However, the selections are not generated within each iteration of the Monte Carlo loop, as discussed above in the example process 300. Rather, the computing platform, at block 508a, uses the input data record and a k-th pair from the dataset $D_{MC}$ to compute a k-th iteration-specific contribution value for the current group of interest for each successive loop. Each iteration-specific contribution value is otherwise calculated as discussed above and shown by way of example in Equations 13 and 14. The computing platform continues iterating on block 508a until M iterations have been performed.

At block 510, after all iteration-specific contribution values for the current group of interest are calculated, the computing platform may aggregate the iteration-specific contribution values calculated for each iteration and thereby determine the estimated QSHAP value for the current group of interest, as discussed above with respect to block 310 of the example process 300 and Equation 15.

In view of the above, it will be appreciated that the dataset $D_{MC}$ of (data record, coalition) pairs only needs to be generated once, and then may be reused for each new input data record that is scored by the trained model object. However, the example process 300 and the example process 500 are not necessarily mutually exclusive. For example, the dataset $D_{MC}$ may include a number of (data record, coalition) pairs that is less than the number of iterations M that are desired for a given Monte Carlo analysis (e.g., to achieve a desired estimation error). Accordingly, the computing platform may perform a number of iterations according to block 508a until pairs from the dataset $D_{MC}$ are exhausted, and then continue the analysis by performing additional iterations according to blocks 308a-308c until the desired number of iterations have been performed. Other implementations that include elements of one or both of the example processes 300 and 500 are also possible.

Although the foregoing examples contemplate using a Monte Carlo analysis to approximate true QSHAP values, it may be desirable in some situations to use a Monte Carlo analysis in a similar way to approximate QSHAP values for the empirical marginal game, which suffer from the same complexity issues due to the $2^i$ number of terms, as discussed above. In practice, an approximation of empirical marginal values may be carried out by adjusting the approach described above to specify an arbitrarily large number M of Monte Carlo iterations, independently of the size of the set of historical data records. Further, the adjusted approach would use a randomly-selected sample from the set of historical data records for each iteration of the Monte Carlo loop, rather than iterating through the historical dataset consecutively. For example, block 308a of FIG. 3 may be adjusted to identify a random sample from the set of historical data records, which is then used at block 308c—instead of a k-th consecutive sample—to compute the iteration-specific contribution value for the respective variable group. The Monte Carlo analysis discussed above in relation to FIG. 5 may be similarly adjusted to approximate empirical marginal values by specifying an arbitrarily large number M of Monte Carlo iterations. Further, for each iteration, a randomly-selected sample from the set of historical data records would be identified at block 505a, and then saved, at block 505c, along with the random group coalition as the k-th pair in the dataset of pairs. Other variations are also possible.

A similar approach for approximating QSHAP group contribution values using Monte Carlo sampling is discussed in U.S. patent application Ser. No. 18/111,823 filed on DATE Feb. 20, 2023 and entitled "COMPUTING SYSTEM AND METHOD FOR APPLYING MONTE CARLO ESTIMATION TO DETERMINE THE CONTRIBUTION OF DEPENDENT INPUT VARIABLE GROUPS ON THE OUTPUT OF A DATA SCIENCE MODEL," which is incorporated herein by reference in its entirety.

Figure 6:
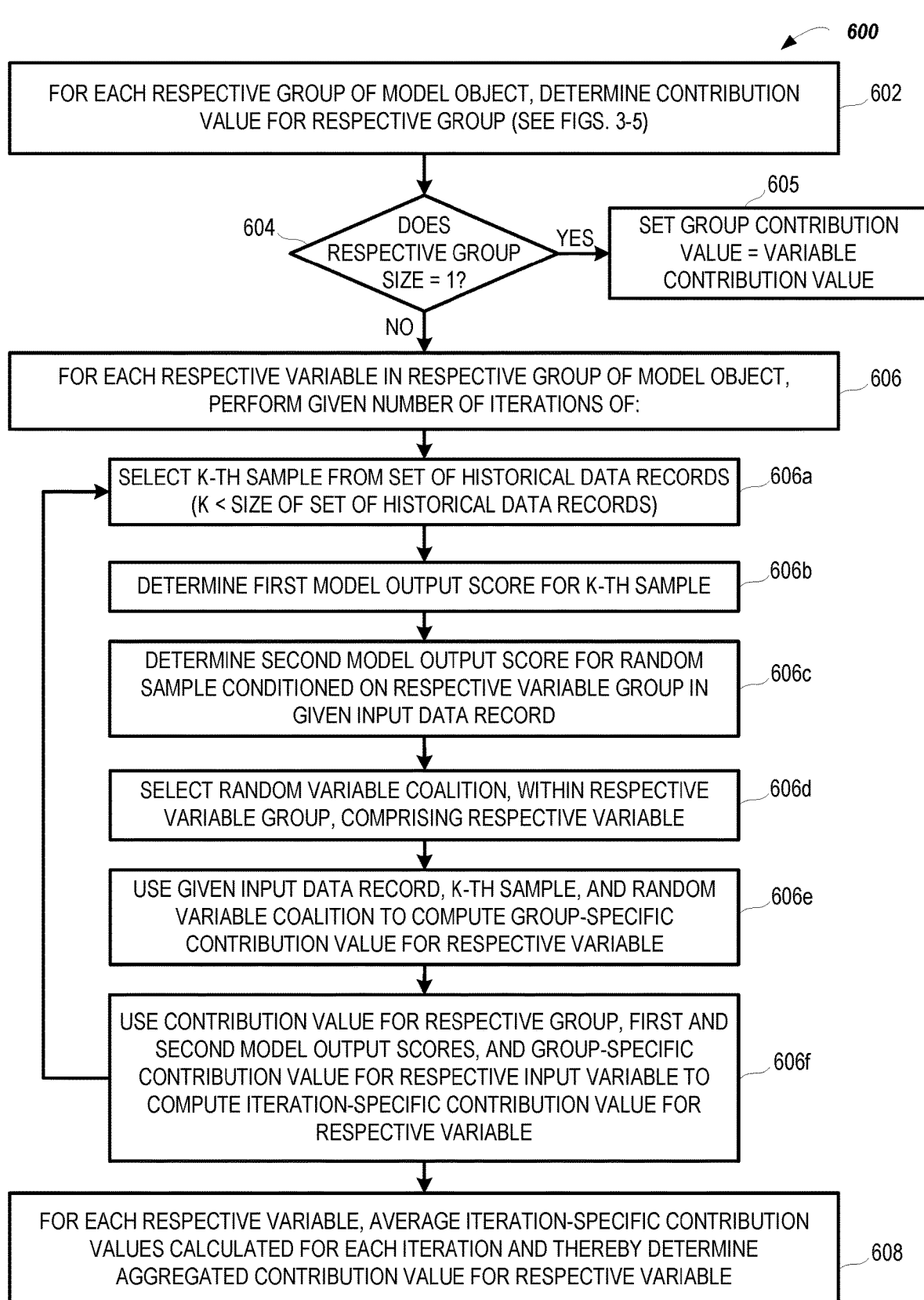
FIG. 6 is a flow chart that illustrates one possible example of a process for calculating two-step Shapley (two-step SHAP) values in accordance with the present disclosure.

Turning to FIG. 6, a flow chart is shown that illustrates one example of a process 600 for approximating marginal two-step SHAP values using Monte Carlo sampling techniques in accordance with the present disclosure. The example process 600 of FIG. 6 may be carried out by any computing platform that is capable of creating a data science model, including but not limited the computing platform 102 of FIG. 1. Further, it should be understood that the example process 600 of FIG. 6 is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

In practice, the process 600 for approximating two-step SHAP values may be based on several of the steps described with respect to the processes 300 and 500 for approximating QSHAP values. In particular, the process 600 may be based on the same model object that is trained to receive an input data record that includes a given set of input variables, evaluate the received input data record, and then output a score that is used to make a given type of decision (e.g., a decision whether or not to extend a particular type of financial service such as a loan, a credit card account, a bank account, or the like to a respective individual within a population), as discussed above.

For blocks of the process 600 shown in FIG. 6, the ongoing example discussed above with respect to QSHAP values will be continued to help illustrate various aspects of the Monte Carlo sampling techniques discussed herein. Accordingly, the model object referred to in FIG. 6 is the same model object that was trained in blocks 302 and 502 using the dataset $D_X$ that includes one thousand input data records, such that $D_X=\{x^{(1)}, \ldots, x^{(1000)}\}$, with $x^{(i)} \in \mathbb{R}^7$, and configured to receive an input vector X that includes the input variables $X_1$, $X_2$, $X_3$, . . . , $X_6$. As above, the model object may be represented as the function $f(x_1, x_2, x_3, x_4, x_5, x_6)=f(x)$ that outputs a score for a given input data record that includes values for each of the input variables. Further, the model object's input variables are arranged (as per blocks 304 and 504) based on their dependencies into the variable groups $S_1$, $S_2$ and $S_3$ of the partition $\mathcal{P}$, as shown visually in FIG. 4B. Still further, the discussion of the process 600 below will refer to the given input data record $$x^* = (x_1^*, x_2^*, x_3^*, x_4^*, x_5^*, x_6^*)$$

that was identified at block 306 and 506.

Accordingly, the example process 600 shown in FIG. 6 begins at block 602 with the determination of QSHAP values for each of the variable groups $S_1$, $S_2$ and $S_3$, which may proceed as discussed above and as shown in FIGS. 3-5.

At block 604, the computing platform may determine, for each respective variable group of the partition $\mathcal{P}$, whether the group includes only a single input variable such that the group has a size of $S_j=1$. As noted above, the two-step SHAP value for an input variable that includes no other input variables within its group is the same as the QSHAP value for the group. Thus, if a given group has a size of $S_j=1$, the computing platform may set the QSHAP value for the group as the two-step SHAP value for the single input variable, as shown at block 605. In the ongoing example discussed herein, the variable group $S_2$ includes only the input variable $X_4$. Thus, the the QSHAP value for the group $S_2$ will be set as the two-step SHAP value for the input variable $X_4$.

On the other hand, for all variable groups that include at least two input variables, the computing platform may begin running an iterative Monte Carlo loop at block 606 for each given input variable within a given variable group, shown by sub-blocks 606a-606f, that operates to generate observations (e.g., one observation per iteration) for the given input variable that are based on (i) the QSHAP value for the given variable group, (ii) consecutively selected samples from the dataset of historical records, (iii) a randomly selected coalition of input variables within the variable group that includes the given input variable. As a preliminary step, the computing platform may determine a number of iterations, given by M, which is less than or equal to the size of the dataset of historical records, that are to be performed. In some implementations, this number may be a default value (e.g., M=1000, etc.) set by the organization or individual that is utilizing the data science model in question. In other implementations, the number of iterations may be customizable by a user, among other possibilities.

Additionally, the computing platform may select an input variable on which to begin the Monte Carlo analysis, which may be referred to herein as the current variable of interest. Further, the variable group that includes the input variable of interest may be referred to herein as the current group of interest. In some implementations, the computing platform may simply begin the Monte Carlo analysis with the first input variable, here $X_1$, within the first variable group, here group $S_1$, and then move to the next input variable sequentially when the two-step SHAP value for the first input variable is determined, such that the next input variable, here $X_2$, becomes the current variable of interest, still within the current group of interest $S_1$, and so on. After the two-step SHAP values for the input variables in group $S_1$ are determined, the computing platform may then move sequentially to the next input variable that is included in a group that has at least two input variables. The single input variable $X_4$ in the group $S_2$ will be skipped, as its two-step SHAP value has already been determined (i.e., as the QSHAP value for the group $S_2$). Thus, the computing platform may move to the next input variable, here $X_5$, with the group $S_3$ becoming the current group of interest, and so on. In other implementations, as suggested above, the computing platform may run an iterative Monte Carlo loop for some or all input variables and/or variable groups in parallel, such that the two-step SHAP values for multiple variables interest are determined concurrently. Other examples for how the computing platform may select one or more current variables of interest are also possible.

At block 606a, at the k-th iteration, the computing platform may identify the k-th sample from a set of historical data records. In some implementations, the computing platform my re-use the same samples that were used in the QSHAP analysis discussed above. In other implementations, the computing platform may sample the training dataset $D_X$ independently from the sampling that provided the basis for the QSHAP analysis. In either case, the k-th sample for a given iteration may be expressed as $x^{(k)}$ as above, where k is a consecutively selected integer between 1 and 1000 (i.e., the total number of samples in the training dataset $D_X$). Accordingly, the sample $x^{(k)}$ may include respective values for the trained model object's six input variables that may be represented by $$x^{(k)} = x_1^{(k)}, x_2^{(k)}, x_3^{(k)}, x_4^{(k)}, x_5^{(k)}, x_6^{(k)}.$$

At block 606b, the computing platform may determine a first model output score for the sampled historical data record $x^{(k)}$. This yields an iteration specific score $\tilde{f}_k$ for the model, which may be expressed as $$\tilde{f}_k = f(x^{(k)}) \qquad \text{(Eq. 16)}$$

and which, when averaged over all iterations of the Monte Carlo loop, will approximate the expected value of the model output over the dataset $D_X$.

At block 606c, at the k-th iteration, the computing platform may determine a second model output score for the k-th historical data record $x^{(k)}$, but this time conditioned on the current group of interest in the input data record x*. This yields an iteration-specific score $$f_k^j$$

for the model that may be expressed as $$f_k^j = f\left(x_{S_1}^*, x_{S_3 \cup S_2}^{(k)}\right) \qquad \text{(Eq. 17)}$$

where the input variables of the current group of interest, here $S_1$, are mixed with the remaining input variables from the k-th historical data record $x^{(k)}$ to create a synthetic input data record for the model object. This score, when averaged over all iterations of the Monte Carlo loop for the current variable of interest, will approximate the expected value of the model output conditioned on the current group of interest. As discussed above, this value is used in the two-step SHAP formula to isolate the surplus coalitional value obtained by the current group of interest in the quotient marginal game. Expanding this equation to include the specific variables in each term for the ongoing example may be given by $$f_k^j = f\left(x_1^*, x_2^*, x_3^*, x_4^{(k)}, x_5^{(k)}, x_6^{(k)}\right) \qquad \text{(Eq. 18)}$$

At block 606d, the computing platform may select a random variable coalition that includes the current variable of interest and zero or more other variables from within the current group of interest. For instance, in the ongoing example, the input variables within the current group of interest $S_1$ are the variables $X_1$, $X_2$, and $X_3$. Assuming that the current variable of interest for the Monte Carlo loop is the input variable $X_1$, there are four possible coalitions that might be selected, including (i) a coalition with $X_2$, (ii) a coalition with $X_3$, (iii) a coalition with both $X_2$ and $X_3$, or (iv) a coalition with neither $X_2$ nor $X_3$ (i.e., a coalition with $X_1$ by itself).

The computing platform may select the random variable coalition in generally the same manner that the random group coalition was selected in the QSHAP analysis at block 308b of process 300. In particular, that the chances of selecting a given coalition are distributed according to the probabilities given by the corresponding coefficients of the Shapley value formula with 3 players, i.e., the probabilities presented in relation to Equation 9. As one possibility, the computing platform may generate a random ordering of the variables within the group of interest, and then select a coalition based on the position of the current variable of interest within the random ordering (e.g., by selecting the coalition that includes the current group of interest and any other variable(s) that precede or follow it within the random ordering). As another possibility, the computing platform may first generate the size of the variable coalition $\tau \in \{0, 1, 2, 3, \ldots s\}$ using the binomial distribution Binom(s−1, p=0.5), where s is the size of the group of interest $S_j$, then generate a list of all possible variable coalitions of size $\tau$ and then randomly select a variable coalition from the list. Other possibilities also exist.

Further, it should be noted that, like the random selection of a group coalition for the QSHAP analysis, the random selection of a variable coalition at block 606d is non-uniform. This is because the probability of occurrence of each possible variable coalition must correspond to the probability given by the corresponding coefficients of the Shapley value formula with s players, where s is the number of input variables within the current group of interest. Therefore, when selecting the random variable coalition as discussed at block 606d, the computing platform must apply a weight to each potential coalition such that the probability that a given coalition will be randomly selected corresponds to the coefficient of the Shapley value formula with s players; specifically, a coalition of variable(s) $B \subseteq q$ $\{1, \ldots s\}$ that has a probability of occurrence $$\frac{(|S_j| - |B| - 1)!|B|!}{|S_j|!}.$$

Other implementations for selecting a random variable coalition in a way that incorporates the probability of each coalition are also possible.

Similar to the QSHAP analysis, it will be appreciated that the Monte Carlo analysis for two-step SHAP discussed herein is selecting observations consecutively from the dataset $D_X$ and performing non-uniform random sampling of the variable coalitions that are elements of the current group of interest simultaneously with each iteration. This approach advantageously avoids the need to calculate a double summation, which would be the case if one constructed an estimator by iterating separately through historical records and then through coalitions.

At block 606e, at the k-th iteration, the computing platform may use the input data record, the k-th historical data record, and the randomly-selected variable coalition to compute a group-specific contribution value (i.e., Shapley value) for the current variable of interest. At a high level, this computation may involve determining the difference between (i) an expected output of the model object for a first synthetic input data record that includes the current variable of interest included in the randomly-selected variable coalition, within the randomly-selected group coalition and (ii) an expected output of the model object for a second synthetic input data record where the current variable of interest is removed from the variable coalition. This computation may be carried out in various ways and may involve various sub-steps, some examples of which will be described below.

First, the computing platform may generate a first synthetic data record that includes a mix of input variables from (i) the given input data record (i.e., the given input data record identified at block 306 of process 300) and (ii) the consecutively selected historical data record (i.e., the sample identified at block 606a). The mix of variables between these two data records may be dictated by the randomly-selected variable coalition (i.e., the coalition randomly selected at block 606d).

For instance, at the k-th iteration, generating the mix of input variables for the first synthetic data record may involve identifying the subset of the model object's input variables that are included in the randomly-selected variable coalition, which as noted above will include the current variable of interest and zero or more other variables from the group of interest. For this identified subset of input variables, the computing platform may use the values for each input variable from the given input data record. Then, for all other input variables that were not included in the identified subset (i.e., the input variables that were not included in the variable coalition), the computing platform may use the values for each input variable from the k-th historical data record.

In this way, the first synthetic data record may, when it is input into the trained model object, result in an output score that includes the contribution of the current variable of interest to the current group of interest.

In a similar way, the computing platform may generate a second synthetic data record. As above, the second synthetic data record may include a mix of input variables from (i) the given input data record and (ii) the consecutively selected historical data record. The mix of variables between these two data records may again be dictated by the randomly-selected variable coalition-however, the mix of input variables may be adjusted with respect to the first synthetic data record to remove the contribution of the current variable of interest.

For instance, at the k-th iteration, generating the adjusted mix of input variables for the second synthetic data record may involve identifying the subset of the model object's input variables that are included in the randomly-selected variable coalition, but ignoring the current variable of interest. As noted above, the remaining variables in the coalition may include zero or more other variables. For this identified subset of input variables-excluding the current variable of interest—the computing platform may use the values for each input variable from the given input data record. Then, for all other input variables, including the current variable of interest, the computing platform may use the values for each input variable from the k-th historical data record.

In this way, the second synthetic data record may, when it is input into the trained model object, result in an output score that removes the contribution of the current variable of interest from the randomly-selected variable coalition within the current group of interest.

Accordingly, the computing platform may use the given model object to generate an output score for each of the two synthetic data records and then calculate the difference between the two scores. This difference may represent the iteration-specific, group-specific contribution value for the current variable of interest to the current group of interest.

Applying this to the ongoing example discussed above, where the model object is represented by a function $f(x_1, \ldots, x_6)$, the variable groups are divided according to the partition P that includes groups $S_1$, $S_2$, and $S_3$, where variable $X_1$ (within group $S_1$) is the current variable of interest, x* represents the given input data record, $x^{(k)}$ represents the k-th consecutively selected historic data record, and the randomly-sampled variable coalition within group $S_1$ (not containing variable $X_1$) is variable $X_3$, the iteration-specific, group-specific contribution value calculated at iteration k for the current variable of interest $X_1$ may be given by the following:

$$\phi_{1,S_1}^{ME,k} = f\left(x_{(3)\cup\{1\}}^*, x_{S_3\cup S_2\cup\{2\}}^{(k)}\right) - f\left(x_{(3)}^*, x_{S_3\cup S_2\cup\{2\}\cup\{1\}}^{(k)}\right) \qquad \text{(Eq. 19)}$$

As discussed above, this equation calculates a difference between the model outputs for two synthetically created data records, which serves to isolate the group-specific contribution of the current variable of interest $X_1$. Expanding this equation to include the specific variables in each term may be given by the following:

$$\phi_{1,S_1}^{ME,k} = \qquad\qquad\qquad\qquad\qquad\qquad\qquad \text{(Eq. 20)}$$
$$f\left(x_1^*, x_2^{(k)}, x_3^*, x_4^{(k)}, x_5^{(k)}, x_6^{(k)}\right) - f\left(x_1^{(k)}, x_2^{(k)}, x_3^*, x_4^{(k)}, x_5^{(k)}, x_6^{(k)}\right)$$

As can be seen by reviewing this expanded equation, the value for the current variable of interest $X_1$ is taken from the given input data record x* in the first term of the difference (i.e., the first synthetic data record), but is then replaced by value taken from the k-th historic data record $x^{(k)}$ in the second term of the difference (i.e., the second synthetic data record). Whereas, the values for the randomly-selected variable coalition (i.e., the input variable $X_3$) are taken from the input data record x* in both terms of the difference.

At block 606f, at the k-th iteration, the computing platform may use the contribution value (i.e., the QSHAP value) for the current group of interest, the first and second model output scores for the k-th historical data record, and the group-specific contribution value for the current variable of interest to compute an iteration-specific two-step SHAP value for the current variable of interest, which may be expressed as $$TS_i^{P,ME,k} = \phi_{i,S_j}^{ME,k} + \frac{1}{3}\left(\overline{\phi}_j^{P,ME} - f_k^j + \overline{f}_k\right) \qquad \text{(Eq. 21)}$$

where $$\phi_{i,S_j}^{ME,k}$$

is the iteration-specific, group-specific contribution value for the current variable of interest given by Equations 19 and 18, $$\overline{\phi}_j^{P,ME}$$

is the QSHAP value for the current group of interest given by Equation 15, $$f_k^j$$

is the iteration-specific model output score conditioned on the current group of interest given by Equations 17 and 18, and $\overline{f}_k$ is the iteration-specific model output score given by Equation 16.

As noted above, the blocks 606a-606f and the resulting calculations presented here represent a single iteration of the Monte Carlo loop, represented by k in the Equations 16-21, which the computing platform will perform a total of M times, where M≤|$D_X$|. Thus, the process 600 shown in FIG. 6 returns to block 606a for a next iteration, where the next consecutive sample is identified from the set of historical data records, another first and second model output scores are determined, another random variable coalition (e.g., a different random variable coalition within the current group of interest) is selected, and so on, until a next iteration-specific contribution value for the current variable of interest is determined.

At block 608, after all iteration-specific contribution values for the current variable of interest are calculated, the computing platform may aggregate the iteration-specific contribution values calculated for each iteration and thereby determine an aggregated contribution value for the current variable of interest. This aggregated contribution value represents the estimated two-step SHAP value for the current variable of interest.

The computing platform may perform the aggregation in block 608 in various ways. For instance, the computing platform may determine an average of all the iteration-specific contribution values, across all iterations for the current variable of interest. This aggregation may be represented by the following:

$$\overline{TS}_i^{P,ME} = \sum_{k=1}^{M} TS_i^{P,ME,k} =$$

$$\frac{1}{M}\sum_{k=1}^{M}\phi_{i,S_j}^{ME,k} + \frac{1}{|S_j|}\left(\overline{\phi}_j^{P,ME} - \frac{1}{M}\sum_{k=1}^{M}f_k^j + \frac{1}{M}\sum_{k=1}^{M}\overline{f}_k\right)$$

(Eq. 22)

The computing platform may determine the aggregated contribution value from the iteration-specific contribution values in other ways as well.

As will be appreciated from the discussion above, the Monte Carlo loop beginning at block 606 in FIG. 6, including M iterations of consecutively selected historical data records and randomly-sampled variable coalitions is performed for each respective input variable that is included in a group of at least one other input variable, as discussed above at block 604. Accordingly, to complete the example above and thereby determine the two-step SHAP values for each input variable in the given input data record x*, the preceding steps would be duplicated using the input variable $X_2$ as the current variable of interest (with group $S_1$ as the current group of interest) and duplicated again for each input variable other than input variable $X_4$ as the current variable of interest, using the corresponding variable group as the current group of interest for each iteration.

Although the total number of calculations to be performed for the Monte Carlo analysis discussed here may be relatively large depending on the number of input variables and variable groups that are formed, it should be noted that, because the calculations for determining two-step SHAP values are largely independent of each other (i.e., the two-step SHAP calculation for a given input variable only requires the a priori calculation of the QSHAP value for the corresponding variable group), the Monte Carlo analysis lends itself to parallel computing. For instance, once one or more QSHAP values are determined for the variable group(s) of a given input data record, the computing platform may run a respective Monte Carlo loop, represented by blocks 606a-606f in FIG. 6, for all input variables of the given variable group(s) simultaneously. Thus, if computing resources adapted to undertake this type of parallel computing (e.g., one or more graphics processing units (GPUs)) are available, the total time required to perform the Monte Carlo analysis discussed herein may be kept relatively low, even for a large number calculations that may be required for a large number of input variables.

Although the foregoing examples contemplate using a Monte Carlo analysis to approximate true two-step SHAP values, it may be desirable in some situations to use a Monte Carlo analysis in a similar way to approximate two-step SHAP values for the empirical marginal game, which suffer from the same complexity issues due to the 2' number of terms, as discussed above. In practice, an approximation of empirical marginal values may be carried out by adjusting the approach described above to specify an arbitrarily large number M of Monte Carlo iterations, independently of the size of the set of historical data records. Further, the adjusted approach would use a randomly-selected sample from the set of historical data records for each iteration of the Monte Carlo loop, rather than iterating through the historical dataset consecutively. For example, block 606a of FIG. 6 may be adjusted to identify a random sample from the set of historical data records, which is then used at block 606e-instead of a k-th consecutive sample—to compute the iteration-specific, group-specific contribution value for the respective input variable. Other variations are also possible.

Turning now to FIG. 7, one possible output of the Monte Carlo analysis discussed above is shown, where both a QSHAP value for each of the variable groups and a two-step SHAP for each individual input variable have been determined for the model object's output for the given input data record x*. As shown in FIG. 7, the contribution value for the variable group $S_1$ is 0.65. This scalar value may indicate that the variable group $S_j$ has a relatively strong positive contribution to the particular type of decision that is made based on the model object's output. Further, it can be seen that the contribution values of the variable group $S_j$ is the sum of the two-step SHAP values for the individual input variables within the variable group $S_1$. In particular, the two-step SHAP value of 0.45 for input variable $X_1$ may indicate a moderate positive contribution to the model object's output, while the two-step SHAP value of 0.15 for input variable $X_2$ indicates a positive contribution that is somewhat less strong, and the two-step SHAP value of 0.05 for input variable $X_3$ indicates a relatively minimal positive contribution.

On the other hand, the QSHAP value shown in FIG. 7 for the variable group $S_2$ is −0.25. This scalar value may indicate that the variable group $S_2$ has a relatively moderate negative contribution to the particular type of decision that is made based on the model object's output. Further, because the variable group $S_2$ includes only single variable $X_4$, the two-step SHAP value for the variable $X_4$ is also −0.25. Finally, a QSHAP value for the variable group $S_3$ is 0.05, divided among the input variables $X_5$ and $X_6$, which have two-step SHAP values of 0.02 and 0.03, all of which may indicate that the variable group $S_3$ and the corresponding input variables $X_5$ and $X_6$ have a relatively minimal positive contribution to the particular type of decision that is made based on the model object's output.

The example contribution values shown in FIG. 7 may provide various insights, depending on how the output of the model object in question is defined. For instance, consider one of the example data science models discussed above that is configured to render a decision regarding whether to extend a service being offered by an organization to an individual (e.g., a financial service such as a loan, a credit card account, a bank account, etc.). The data science model may render a decision based on an output score of the trained model object that estimates a risk level of the individual, where a higher score indicates a higher risk. In this example, the contribution value of 0.45 for the input variable $X_1$ indicates that the input variable $X_1$ within the group $S_1$ made a relatively strong contribution to the output of the model object, pushing the estimated risk level of the individual higher. If the output score of the model for the input data record x* was high enough (e.g., above a threshold), the data science model may have rendered a decision not to offer the service to the individual. In this scenario, the two-step SHAP value of 0.45, which has the largest contribution of any of the input variables, may be used as the basis to determine an MRC, which may be provided to the individual as the reason for the adverse decision.

Conversely, the contribution value of −0.25 for the input variable $X_4$ indicates that the input variable $X_4$ within the group $S_2$ made a relatively moderate negative contribution to the output of the model, pushing the estimated risk level of the individual lower. In some cases, a negative contribution such as the one provided by $X_4$ may operate to mitigate the effects of a positive contribution. For example, due to the contribution of $X_4$, the output of the model object may not be above the threshold for the data science model to render an adverse decision.

In this regard, it will be appreciated that the two-step SHAP values discussed herein may provide valuable insights, even in situations where the data science model does not render a particular decision that requires explanation. For example, consider a data science model that is configured to render a decision regarding the likelihood of failure of an industrial asset based on an analysis of operational data for the industrial asset (e.g., sensor data, actuator data, etc.). In this scenario, the two-step SHAP values of each input variable may be calculated and considered for decisions where the model determined a likelihood of failure, such that remedial action that may be taken to avoid or fix the problem before the failure occurs in the given asset and/or in other similarly situated assets. In addition, a computing platform executing the data science model may additionally consider the two-step SHAP values of each input variable for some decisions where the model did not determine a likelihood of failure.

For instance, in view of the possibility that some input variables may negatively impact the model output and thereby reduce the likelihood of a failure prediction, there may be situations in which a particular input variable has a strong enough positive contribution that it would have caused an adverse decision (e.g., a failure prediction), but for the presence of another input variable's negative contribution that mitigated the positive effect. In these situations, even though the data science model has not rendered a decision predicting a failure of the asset, it may nonetheless be advantageous to identify any input variables that had a significant positive contribution to the model, such that pre-emptive maintenance may be considered.

Figure 8:
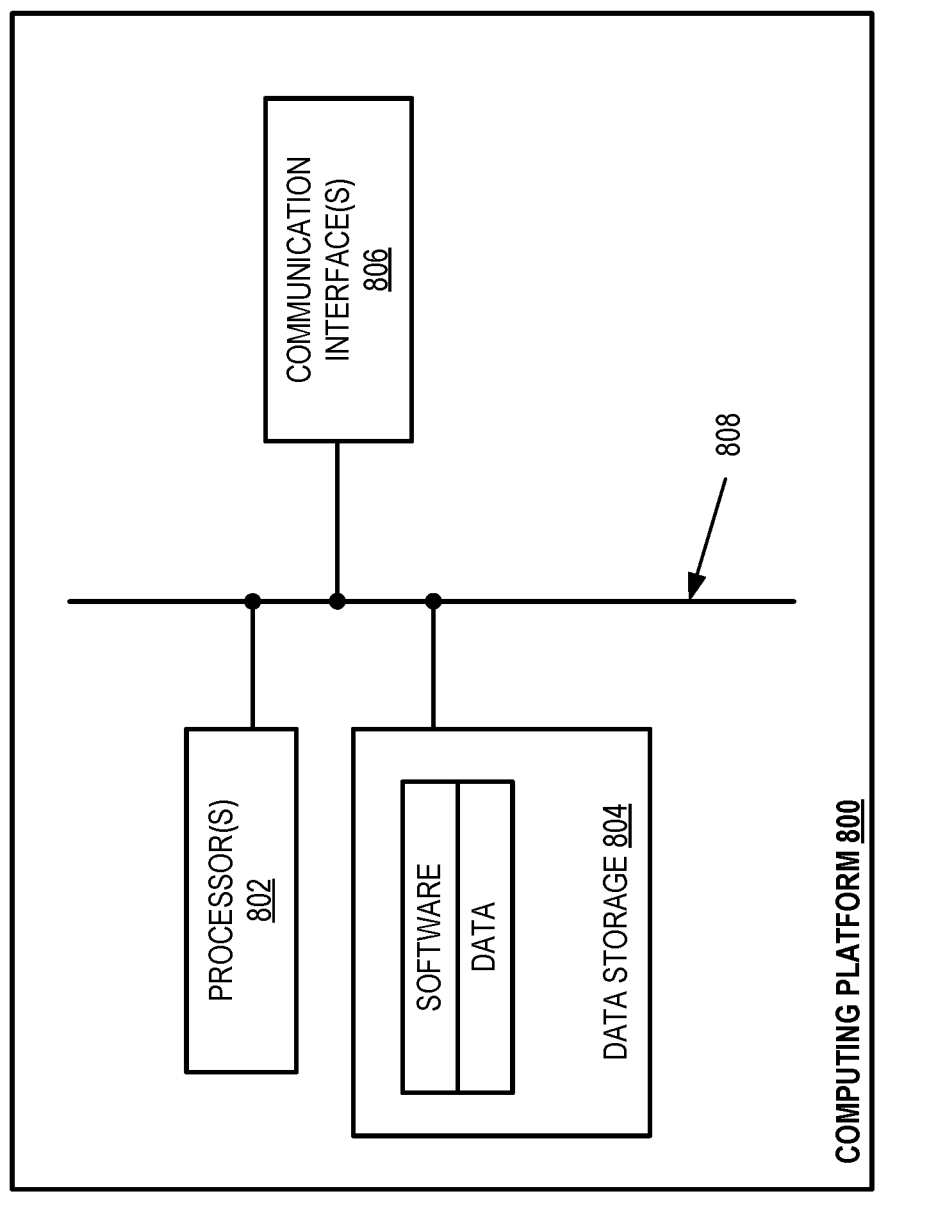
FIG. 8 is a simplified block diagram that illustrates some structural components of an example computing platform.

Turning now to FIG. 8, a simplified block diagram is provided to illustrate some structural components that may be included in an example computing platform 800 that may be configured perform some or all of the functions discussed herein for creating a data science model in accordance with the present disclosure. At a high level, computing platform 800 may generally comprise any one or more computer systems (e.g., one or more servers) that collectively include one or more processors 802, data storage 804, and one or more communication interfaces 806, all of which may be communicatively linked by a communication link 808 that may take the form of a system bus, a communication network such as a public, private, or hybrid cloud, or some other connection mechanism. Each of these components may take various forms.

For instance, the one or more processors 802 may comprise one or more processor components, such as one or more central processing units (CPUs), graphics processing unit (GPUs), application-specific integrated circuits (ASICs), digital signal processor (DSPs), and/or a programmable logic devices such as a field programmable gate arrays (FPGAs), among other possible types of processing components. In line with the discussion above, it should also be understood that the one or more processors 802 could comprise processing components that are distributed across a plurality of physical computing devices connected via a network, such as a computing cluster of a public, private, or hybrid cloud.

In turn, data storage 804 may comprise one or more non-transitory computer-readable storage mediums, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 804 may comprise computer-readable storage mediums that are distributed across a plurality of physical computing devices connected via a network, such as a storage cluster of a public, private, or hybrid cloud that operates according to technologies such as AWS for Elastic Compute Cloud, Simple Storage Service, etc.

As shown in FIG. 8, data storage 804 may be capable of storing both (i) program instructions that are executable by processor 802 such that the computing platform 800 is configured to perform any of the various functions disclosed herein (including but not limited to any the functions described above with reference to FIGS. 3-6), and (ii) data that may be received, derived, or otherwise stored by computing platform 800.

The one or more communication interfaces 806 may comprise one or more interfaces that facilitate communication between computing platform 800 and other systems or devices, where each such interface may be wired and/or wireless and may communicate according to any of various communication protocols, examples of which may include Ethernet, Wi-Fi, serial bus (e.g., Universal Serial Bus (USB) or Firewire), cellular network, and/or short-range wireless protocols, among other possibilities.

Although not shown, the computing platform 800 may additionally include or have an interface for connecting to one or more user-interface components that facilitate user interaction with the computing platform 800, such as a keyboard, a mouse, a trackpad, a display screen, a touch-sensitive interface, a stylus, a virtual-reality headset, and/or one or more speaker components, among other possibilities.

It should be understood that computing platform 800 is one example of a computing platform that may be used with the embodiments described herein. Numerous other arrangements are possible and contemplated herein. For instance, other computing systems may include additional components not pictured and/or more or less of the pictured components.

CONCLUSION

This disclosure makes reference to the accompanying figures and several example embodiments. One of ordinary skill in the art should understand that such references are for the purpose of explanation only and are therefore not meant to be limiting. Part or all of the disclosed systems, devices, and methods may be rearranged, combined, added to, and/or removed in a variety of manners without departing from the true scope and spirit of the present invention, which will be defined by the claims.

Further, to the extent that examples described herein involve operations performed or initiated by actors, such as "humans," "curators," "users" or other entities, this is for purposes of example and explanation only. The claims should not be construed as requiring action by such actors unless explicitly recited in the claim language.

We claim:

1. A computing platform comprising:

at least one processor;

non-transitory computer-readable medium; and program instructions stored on the non-transitory computer-readable medium that are executable by the at least one processor such that the computing platform is configured to:

train a model object for a data science model using a machine learning process, wherein the model object is trained to (i) receive an input data record comprising a set of input variables and (ii) output a score for the input data record;

arrange the set of input variables into two or more variable groups based on dependencies between respective input variables, where each variable group comprises at least one input variable;

identify a given input data record to be scored by the model object;

for each respective variable group of the model object, determine a contribution value for the respective variable group;

for each respective input variable in each respective variable group of the model object, perform a given number of iterations of:

identify a sample historical data record from a set of historical data records;

determine a first model object output score for the sample historical data record;

use the given input data record to determine a second model object output score for the sample historical data record that is conditioned on the respective variable group in the given input data record;

select a random variable coalition, within the respective variable group, comprising the respective input variable and zero or more other input variables;

use the given input data record, the sample historical data record, and the randomly-selected variable coalition to compute a group-specific contribution value for the respective input variable in the respective variable group; and use (i) the contribution value for the respective variable group, (ii) the first model object output score, (iii) the second model object output score, and (iv) the group-specific contribution value for the respective input variable to compute an iteration-specific contribution value for the respective input variable to the model output; and for each respective input variable of the model object, aggregate the iteration-specific contribution values calculated for each iteration and thereby determine an aggregated contribution value for the respective input variable.

2. The computing platform of claim 1, wherein the program instructions that are executable by the at least one processor such that the computing platform is configured to select the random variable coalition, within the respective variable group, comprising the respective input variable and zero or more other input variables comprise program instructions that are executable by the at least one processor such that the computing platform is configured to:

generate a random ordering of two or more input variables within the respective variable group; and define the random variable coalition as including the respective input variable and all other input variables that precede the respective input variable in the generated random ordering.

3. The computing platform of claim 1, wherein the program instructions that are executable by the at least one processor such that the computing platform is configured to use the given input data record, the sample historical data record, and the randomly-selected variable coalition to compute the group-specific contribution value for the respective input variable in the respective group comprise program instructions that are executable by the at least one processor such that the computing platform is configured to:

generate a first synthetic data record comprising a mix of input variables from (i) the given input data record and (ii) the sample historical data record;

generate a second synthetic data record comprising an adjusted mix of input variables from (i) the given input data record and (ii) the sample historical data record;

use the trained model object to determine a first score for the first synthetic data record and a second score for the second synthetic data record; and calculate a difference between the first score and the second score, wherein the difference is the group-specific contribution value.

4. The computing platform of claim 3, wherein the program instructions that are executable by the at least one processor such that the computing platform is configured to generate the first synthetic data record comprising the mix of input variables comprise program instructions that are executable by the at least one processor such that the computing platform is configured to:

identify a subset of input variables that are included in the randomly-selected variable coalition;

for the identified subset of input variables, use values from the given input data record for the first synthetic data record; and for each other input variable, use values from the sample historical data record for the first synthetic data record; and wherein the program instructions that are executable by the at least one processor such that the computing platform is configured to generate the second synthetic data record comprising the adjusted mix of input variables comprise program instructions that are executable by the at least one processor such that the computing platform is configured to:

for the identified subset of input variables, excluding the respective input variable, use values from the given input data record for the second synthetic data record; and for each other input variable, including the respective input variable, use values from the sample historical data record for the second synthetic data record.

5. The computing platform of claim 1, wherein the program instructions that are executable by the at least one processor such that the computing platform is configured to aggregate the iteration-specific contribution values calculated for each iteration comprise program instructions that are executable by the at least one processor such that the computing platform is configured to determine an average of the iteration-specific contribution values for each iteration over the given number of iterations.

6. The computing platform of claim 1, wherein the program instructions that are executable by the at least one processor such that the computing platform is configured to, for each respective input variable in each respective variable group of the model object, perform the given number of iterations comprise program instructions that are executable by the at least one processor such that the computing platform is configured to:

while performing the given number of iterations for a first input variable of the model object, perform the given number of iterations for each other input variable of the model object.

7. The computing platform of claim 1, wherein the given number of iterations is 1,000 or more iterations.

8. The computing platform of claim 1, wherein the program instructions that are executable by the at least one processor such that the computing platform is configured to, for each respective input variable in each respective variable group of the model object, identify the sample historical data record from the set of historical data records comprise program instructions that are executable by the at least one processor such that the computing platform is configured to:

identify a randomly-sampled historical data record from the set of historical data records.

9. A non-transitory computer-readable medium, wherein the non-transitory computer-readable medium is provisioned with program instructions that, when executed by at least one processor, cause a computing platform to:

train a model object for a data science model using a machine learning process, wherein the model object is trained to (i) receive an input data record comprising a set of input variables and (ii) output a score for the input data record;

arrange the set of input variables into two or more variable groups based on dependencies between respective input variables, where each variable group comprises at least one input variable;

identify a given input data record to be scored by the model object;

for each respective variable group of the model object, determine a contribution value for the respective variable group;

for each respective input variable in each respective variable group of the model object, perform a given number of iterations of:

identify a sample historical data record from a set of historical data records;

determine a first model object output score for the sample historical data record;

use the given input data record to determine a second model object output score for the sample historical data record that is conditioned on the respective variable group in the given input data record;

select a random variable coalition, within the respective variable group, comprising the respective input variable and zero or more other input variables;

use the given input data record, the sample historical data record, and the randomly-selected variable coalition to compute a group-specific contribution value for the respective input variable in the respective variable group; and use (i) the contribution value for the respective variable group, (ii) the first model object output score, (iii) the second model object output score, and (iv) the group-specific contribution value for the respective input variable to compute an iteration-specific contribution value for the respective input variable to the model output; and for each respective input variable of the model object, aggregate the iteration-specific contribution values calculated for each iteration and thereby determine an aggregated contribution value for the respective input variable.

10. The non-transitory computer-readable medium of claim 9, wherein the program instructions that, when executed by at least one processor, cause the computing platform to select the random variable coalition, within the respective variable group, comprising the respective input variable and zero or more other input variables comprise program instructions that, when executed by at least one processor, cause the computing platform to:

generate a random ordering of two or more input variables within the respective variable group; and define the random variable coalition as including the respective input variable and all other input variables that precede the respective input variable in the generated random ordering.

11. The non-transitory computer-readable medium of claim 9, wherein the program instructions that, when executed by at least one processor, cause the computing platform to use the given input data record, the sample historical data record, and the randomly-selected variable coalition to compute the group-specific contribution value for the respective input variable in the respective group comprise program instructions that, when executed by at least one processor, cause the computing platform to:

generate a first synthetic data record comprising a mix of input variables from (i) the given input data record and (ii) the sample historical data record;

generate a second synthetic data record comprising an adjusted mix of input variables from (i) the given input data record and (ii) the sample historical data record;

use the trained model object to determine a first score for the first synthetic data record and a second score for the second synthetic data record; and calculate a difference between the first score and the second score, wherein the difference is the group-specific contribution value.

12. The non-transitory computer-readable medium of claim 11, wherein the program instructions that, when executed by at least one processor, cause the computing platform to generate the first synthetic data record comprising the mix of input variables comprise program instructions that, when executed by at least one processor, cause the computing platform to:

identify a subset of input variables that are included in the randomly-selected variable coalition;

for the identified subset of input variables, use values from the given input data record for the first synthetic data record; and for each other input variable, use values from the sample historical data record for the first synthetic data record; and wherein the program instructions that, when executed by at least one processor, cause the computing platform to generate the second synthetic data record comprising the adjusted mix of input variables comprise program instructions that, when executed by at least one processor, cause the computing platform to:

for the identified subset of input variables, excluding the respective input variable, use values from the given input data record for the second synthetic data record; and for each other input variable, including the respective input variable, use values from the sample historical data record for the second synthetic data record.

13. The non-transitory computer-readable medium of claim 9, wherein the program instructions that, when executed by at least one processor, cause the computing platform to aggregate the iteration-specific contribution values calculated for each iteration comprise program instructions that, when executed by at least one processor, cause the computing platform to determine an average of the iteration-specific contribution values for each iteration over the given number of iterations.

14. The non-transitory computer-readable medium of claim 9, wherein the program instructions that, when executed by at least one processor, cause the computing platform to, for each respective variable group of the model object, perform the given number of iterations comprise program instructions that, when executed by at least one processor, cause the computing platform to:

while performing the given number of iterations for a first variable group of the model object, perform the given number of iterations for each other variable group of the model object.

15. The non-transitory computer-readable medium of claim 9, wherein the given number of iterations is 1,000 or more iterations.

16. The non-transitory computer-readable medium of claim 9, wherein the program instructions that, when executed by at least one processor, cause the computing platform to, for each respective input variable in each respective variable group of the model object, identify the sample historical data record from the set of historical data records comprise program instructions that, when executed by at least one processor, cause the computing platform to:

identify a randomly-sampled historical data record from the set of historical data records.

17. A method carried out by a computing platform, the method comprising:

training a model object for a data science model using a machine learning process, wherein the model object is trained to (i) receive an input data record comprising a set of input variables and (ii) output a score for the input data record;

arranging the set of input variables into two or more variable groups based on dependencies between respective input variables, where each variable group comprises at least one input variable;

identifying a given input data record to be scored by the model object;

for each respective variable group of the model object, determining a contribution value for the respective variable group;

for each respective input variable in each respective variable group of the model object, performing a given number of iterations of:

identifying a sample historical data record from a set of historical data records;

determining a first model object output score for the sample historical data record;

using the given input data record to determine a second model object output score for the sample historical data record that is conditioned on the respective variable group in the given input data record;

selecting a random variable coalition, within the respective variable group, comprising the respective input variable and zero or more other input variables;

using the given input data record, the sample historical data record, and the randomly-selected variable coalition to compute a group-specific contribution value for the respective input variable in the respective variable group; and using (i) the contribution value for the respective variable group, (ii) the first model object output score, (iii) the second model object output score, and (iv) the group-specific contribution value for the respective input variable to compute an iteration-specific contribution value for the respective input variable to the model output; and for each respective input variable of the model object, aggregating the iteration-specific contribution values calculated for each iteration and thereby determine an aggregated contribution value for the respective input variable.

18. The method of claim 17, wherein selecting the random variable coalition comprising the respective input variable and zero or more other input variables comprises:

generating a random ordering of two or more input variables within the respective variable group; and defining the random variable coalition as including the respective input variable and all other input variables that precede the respective input variable in the generated random ordering.

19. The method of claim 17, wherein using the given input data record, the sample historical data record, and the randomly-selected variable coalition to compute the group-specific contribution value comprises:

generating a first synthetic data record comprising a mix of input variables from (i) the given input data record and (ii) the sample historical data record;

generating a second synthetic data record comprising an adjusted mix of input variables from (i) the given input data record and (ii) the sample historical data record;

using the trained model object to determine a first score for the first synthetic data record and a second score for the second synthetic data record; and calculating a difference between the first score and the second score, wherein the difference is the group-specific contribution value.

20. The method of claim 19, wherein generating the first synthetic data record comprising the mix of input variables comprises:

identifying a subset of input variables that are included in the randomly-selected variable coalition;

for the identified subset of input variables, using values from the given input data record for the first synthetic data record; and for each other input variable, using values from the sample historical data record for the first synthetic data record; and wherein generating the second synthetic data record comprising the adjusted mix of input variables comprises:

for the identified subset of input variables, excluding the respective input variable, using values from the given input data record for the second synthetic data record; and for each other input variable, including the respective input variable, using values from the sample historical data record for the second synthetic data record.

\* \* \* \* \*